(12) United States Patent
Iida

(10) Patent No.: US 9,727,585 B2
(45) Date of Patent: Aug. 8, 2017

(54) IMAGE PROCESSING APPARATUS AND METHOD FOR CONTROLLING THE SAME

(71) Applicant: CANON KABUSHIKI KAISHA, Tokyo (JP)

(72) Inventor: Tomonori Iida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 14/625,262

(22) Filed: Feb. 18, 2015

(65) Prior Publication Data
US 2015/0234865 A1    Aug. 20, 2015

(30) Foreign Application Priority Data
Feb. 19, 2014   (JP) .................. 2014-029962

(51) Int. Cl.
| | |
|---|---|
| G06F 17/30 | (2006.01) |
| H04N 5/232 | (2006.01) |
| G06K 9/46 | (2006.01) |
| G06K 9/00 | (2006.01) |
| G06K 9/32 | (2006.01) |
| G06T 5/50 | (2006.01) |

(52) U.S. Cl.
CPC ... *G06F 17/30268* (2013.01); *G06K 9/00255* (2013.01); *G06K 9/3241* (2013.01); *G06K 9/46* (2013.01); *G06T 5/50* (2013.01); *H04N 5/23212* (2013.01); *G06K 2209/27* (2013.01); *G06T 2207/10052* (2013.01); *H04N 5/23219* (2013.01); *H04N 5/23229* (2013.01)

(58) Field of Classification Search
None
See application file for complete search history.

(56) References Cited

U.S. PATENT DOCUMENTS

| | | | | |
|---|---|---|---|---|
| 9,087,237 B2 * | 7/2015 | Shimizu | ............. | G06K 9/00255 |
| 9,124,762 B2 * | 9/2015 | Cutler | .................... | H04N 7/142 |
| 9,208,569 B2 * | 12/2015 | Yokoyama | .............. | G06T 5/003 |
| 9,210,315 B2 * | 12/2015 | Nakajima | .......... | H04N 5/23212 |
| 9,305,206 B2 * | 4/2016 | Pegg | .................. | G06K 9/00221 |

(Continued)

FOREIGN PATENT DOCUMENTS

| | | |
|---|---|---|
| JP | 2001-256496 A | 9/2001 |
| JP | 2011-022796 A | 2/2011 |

OTHER PUBLICATIONS

Ng et al. "Light Field Photography with a hand-held Plenoptic Camera" Stanford Tech Report CTSR 2005-02, Apr. 20, 2005 (8 pgs).

*Primary Examiner* — Michael Osinski
(74) *Attorney, Agent, or Firm* — Cowan, Liebowitz & Latman, P.C.

(57) ABSTRACT

An image processing apparatus that processes light field information indicating the intensity distribution of light and incident directions of light, and a method for controlling the same are disclosed. A derivative information analyzing unit 113 analyzes a derivative information that is generated by a derivative information generating unit 112 from light field information, and obtains information representing features of the derivative information. An additional information editing unit 114 generates additional information to be attached to a derivative information, based on the information representing features of the derivative information.

8 Claims, 21 Drawing Sheets

(56) References Cited

U.S. PATENT DOCUMENTS

| | | | | |
|---|---|---|---|---|
| 2010/0157127 A1* | 6/2010 | Takayanagi | H04N 5/23293 | 348/333.02 |
| 2010/0208091 A1* | 8/2010 | Chang | H04N 5/23219 | 348/222.1 |
| 2011/0052073 A1* | 3/2011 | Wallace | G06K 9/00704 | 382/190 |
| 2011/0096142 A1* | 4/2011 | Kiyoshige | H04N 5/23212 | 348/36 |
| 2011/0150273 A1* | 6/2011 | Moore | G06F 17/30265 | 382/103 |
| 2011/0298961 A1* | 12/2011 | Yoshida | G03B 13/36 | 348/333.01 |
| 2013/0215319 A1* | 8/2013 | Tomita | G02B 7/28 | 348/345 |
| 2013/0222543 A1* | 8/2013 | Bae | G01S 17/89 | 348/46 |
| 2014/0176663 A1* | 6/2014 | Cutler | H04N 7/142 | 348/14.07 |
| 2014/0267869 A1* | 9/2014 | Sawa | H04N 5/23293 | 348/333.03 |
| 2014/0307126 A1* | 10/2014 | Son | H04N 5/23212 | 348/231.6 |
| 2014/0354781 A1* | 12/2014 | Matsuyama | H04N 5/23212 | 348/49 |
| 2014/0362188 A1* | 12/2014 | Yokokawa | | 3/42 |
| 2014/0375798 A1* | 12/2014 | Fujita | H04N 1/212 | 348/140 |
| 2015/0085163 A1* | 3/2015 | Aimi | H04N 5/23219 | 348/234 |
| 2015/0092992 A1* | 4/2015 | Ishihara | G06T 7/0069 | 382/106 |
| 2016/0117077 A1* | 4/2016 | Xu | G06F 3/0488 | 715/848 |
| 2016/0182830 A1* | 6/2016 | Hu | G06T 5/003 | 348/231.6 |
| 2016/0323501 A1* | 11/2016 | Eguchi | G03B 13/36 | |

\* cited by examiner

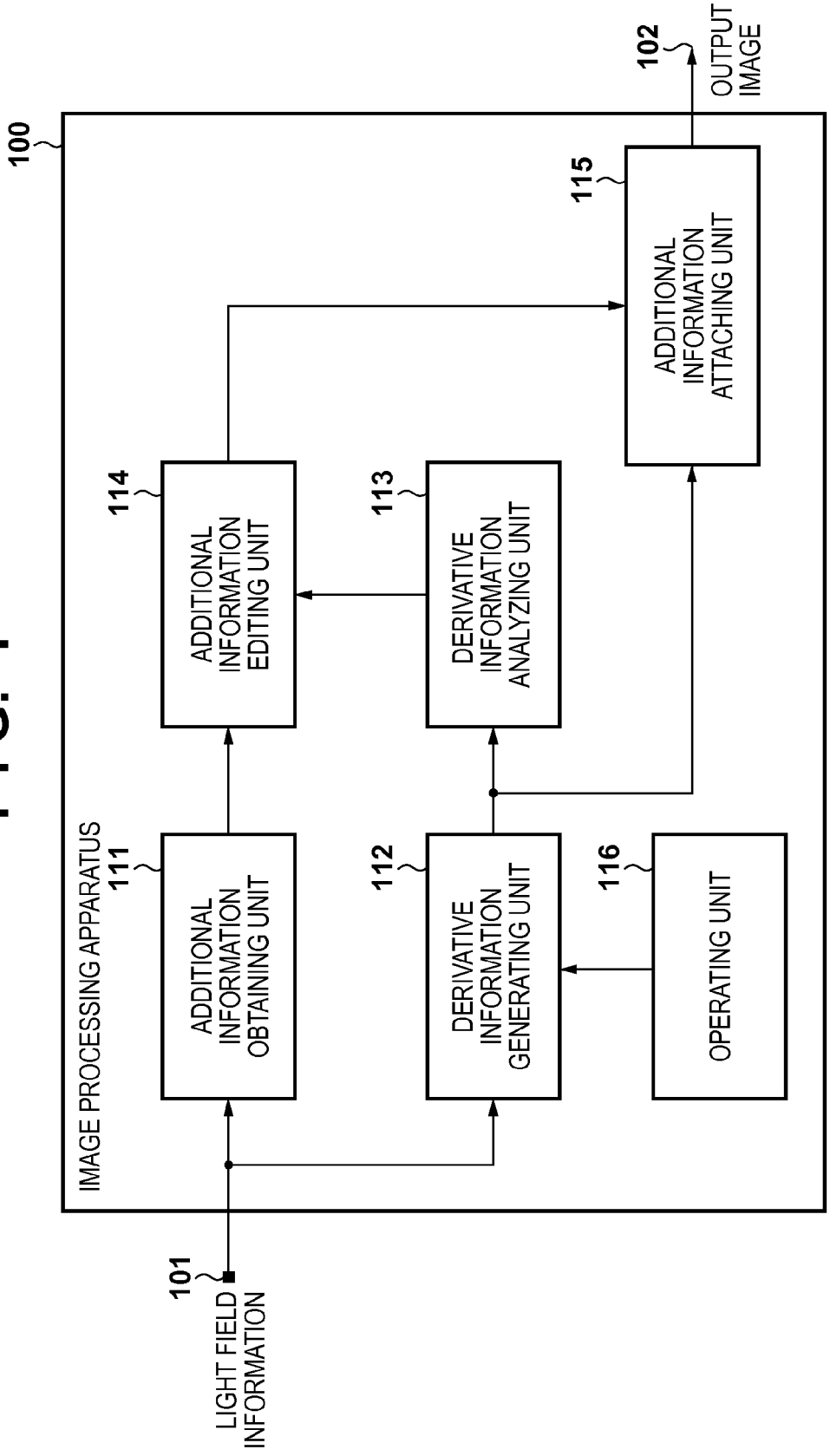

| No. | IDENTIFICATION NAME | DISTANCE INFORMATION |
|---|---|---|
| 1 | MR. A | 30 |
| 2 | MR. B | 50 |
| 3 | MR. C | 90 |

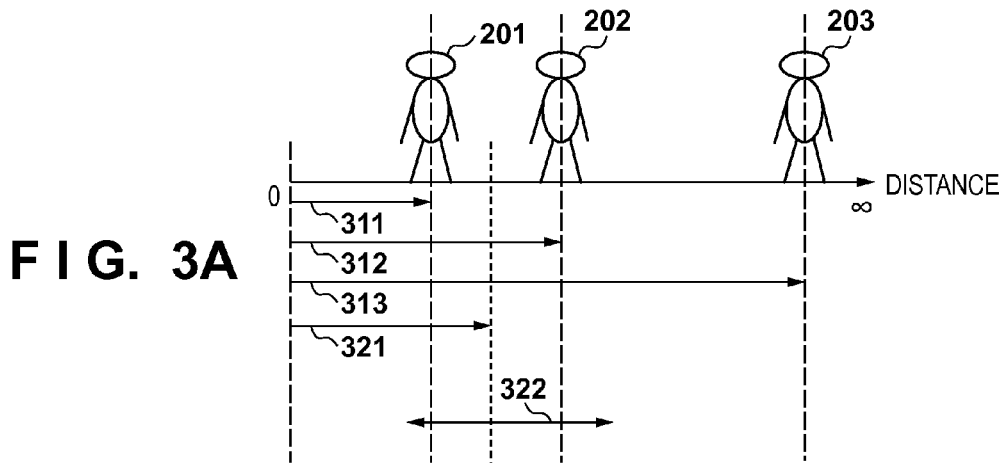
FIG. 3A
| No. | IDENTIFICATION NAME | DISTANCE INFORMATION |
|---|---|---|
| 1 | MR. A | 30 |
| 2 | MR. B | 50 |
| 3 | MR. C | 90 |
↓ EXTRACT
| No. | IDENTIFICATION NAME | DISTANCE INFORMATION |
|---|---|---|
| 1 | MR. A | 30 |
| 2 | MR. B | 50 |
FIG. 3B
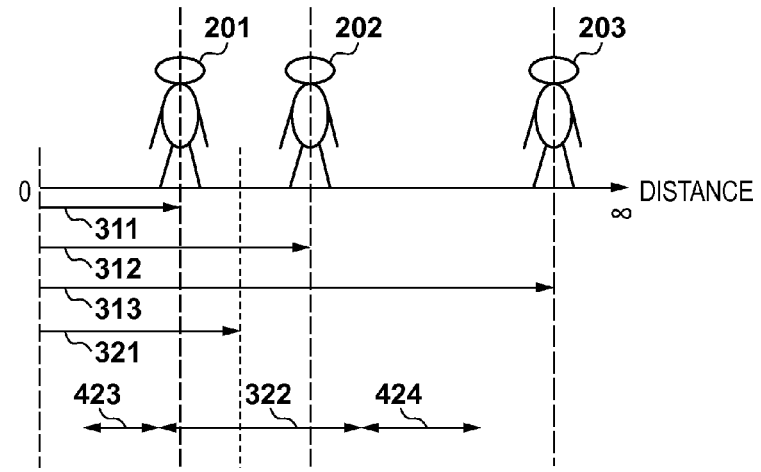
FIG. 3C

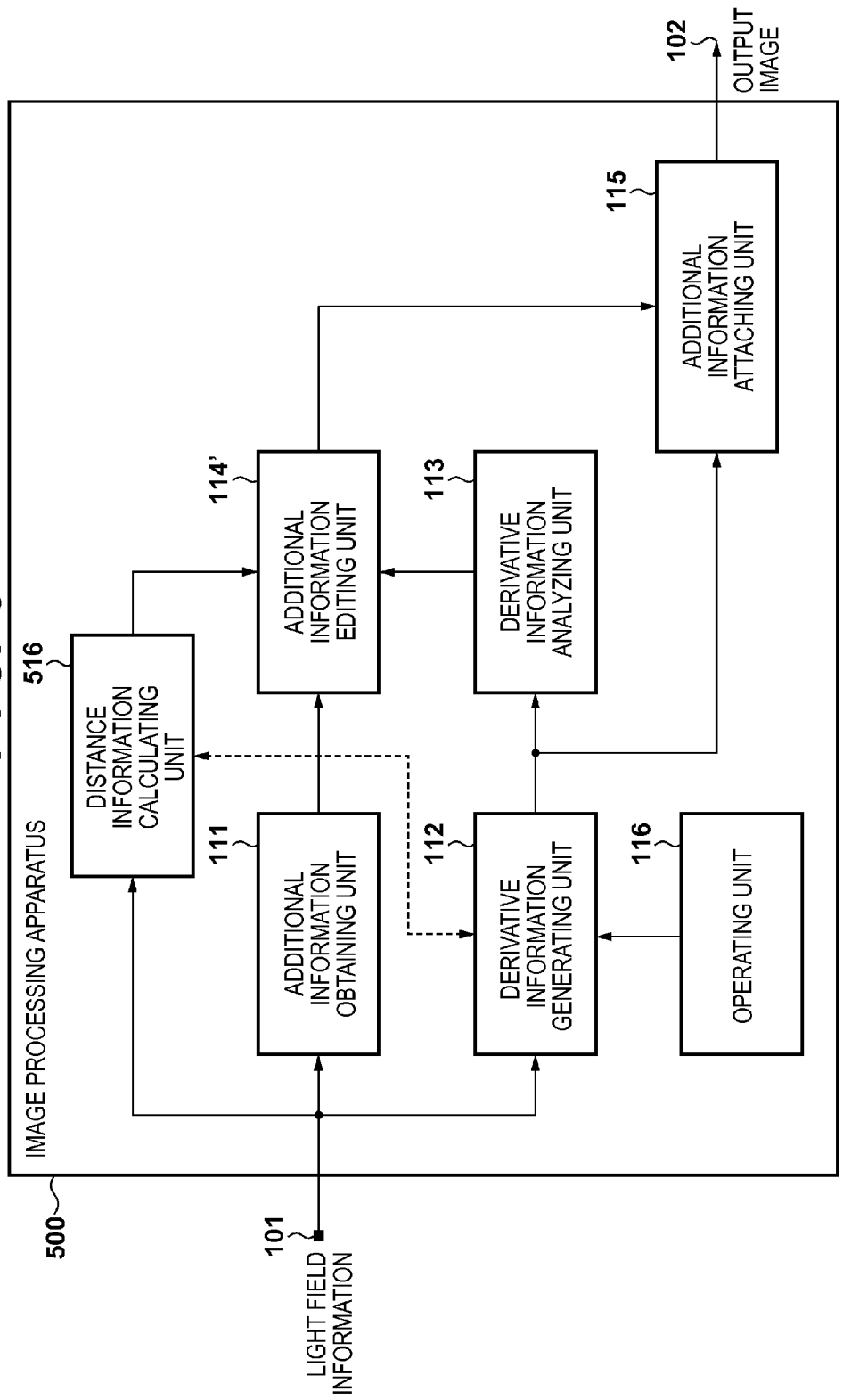

| No. | IDENTIFICATION NAME | COORDINATES Start(x,y) | COORDINATES End(x,y) |
|---|---|---|---|
| 1 | MR. A | (60,20) | (90,60) |
| 2 | MR. B | (10,70) | (40,50) |
| 3 | MR. C | (40,5) | (65,30) |

F I G. 7A
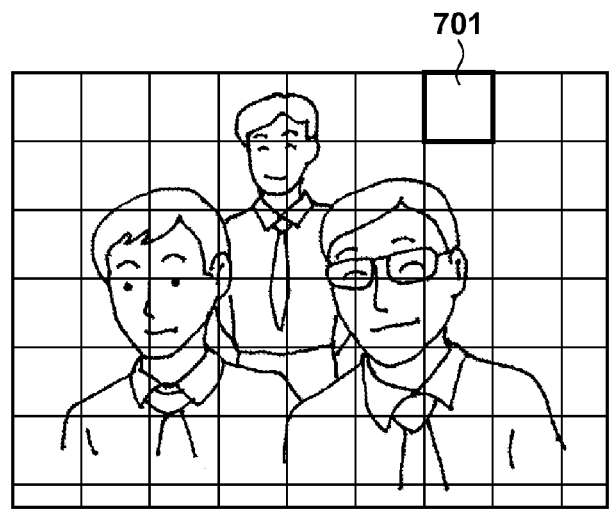
F I G. 7B
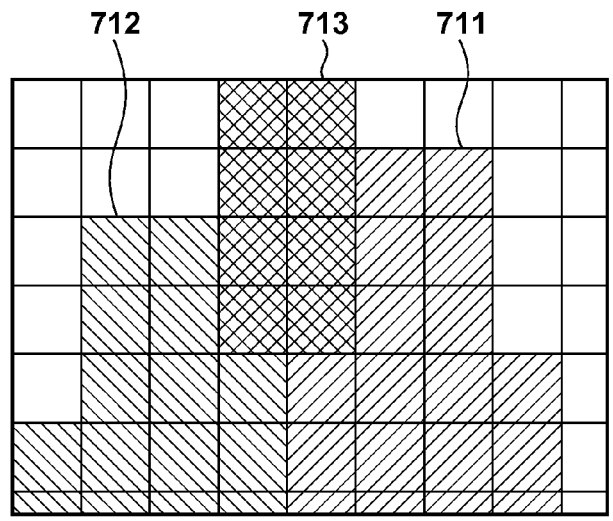
F I G. 7C
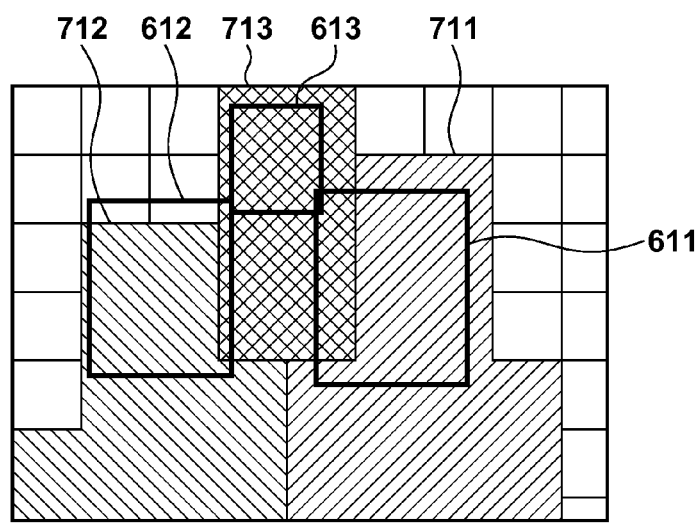

| No. | IDENTIFICATION NAME | COORDINATES Start(x,y) | COORDINATES End(x,y) |
|---|---|---|---|
| 1 | MR. A | (60,20) | (90,60) |
| 2 | MR. B | (10,70) | (40,50) |
| 3 | MR. C | (40,5) | (65,30) |

↓ EXTRACT

| No. | IDENTIFICATION NAME | COORDINATES Start(x,y) | COORDINATES End(x,y) |
|---|---|---|---|
| 1 | MR. A | (60,20) | (90,60) |
| 2 | MR. B | (10,70) | (40,50) |

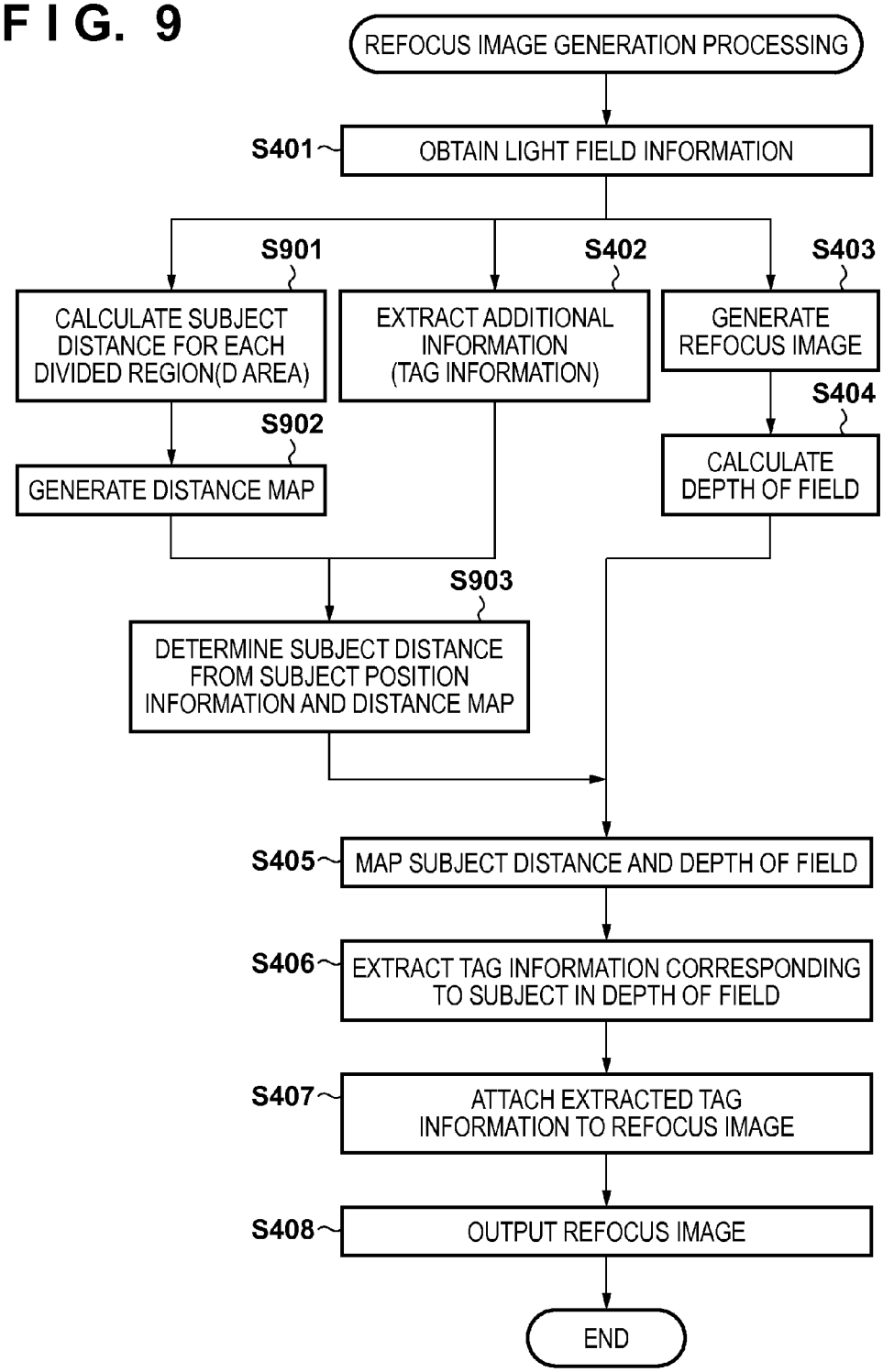

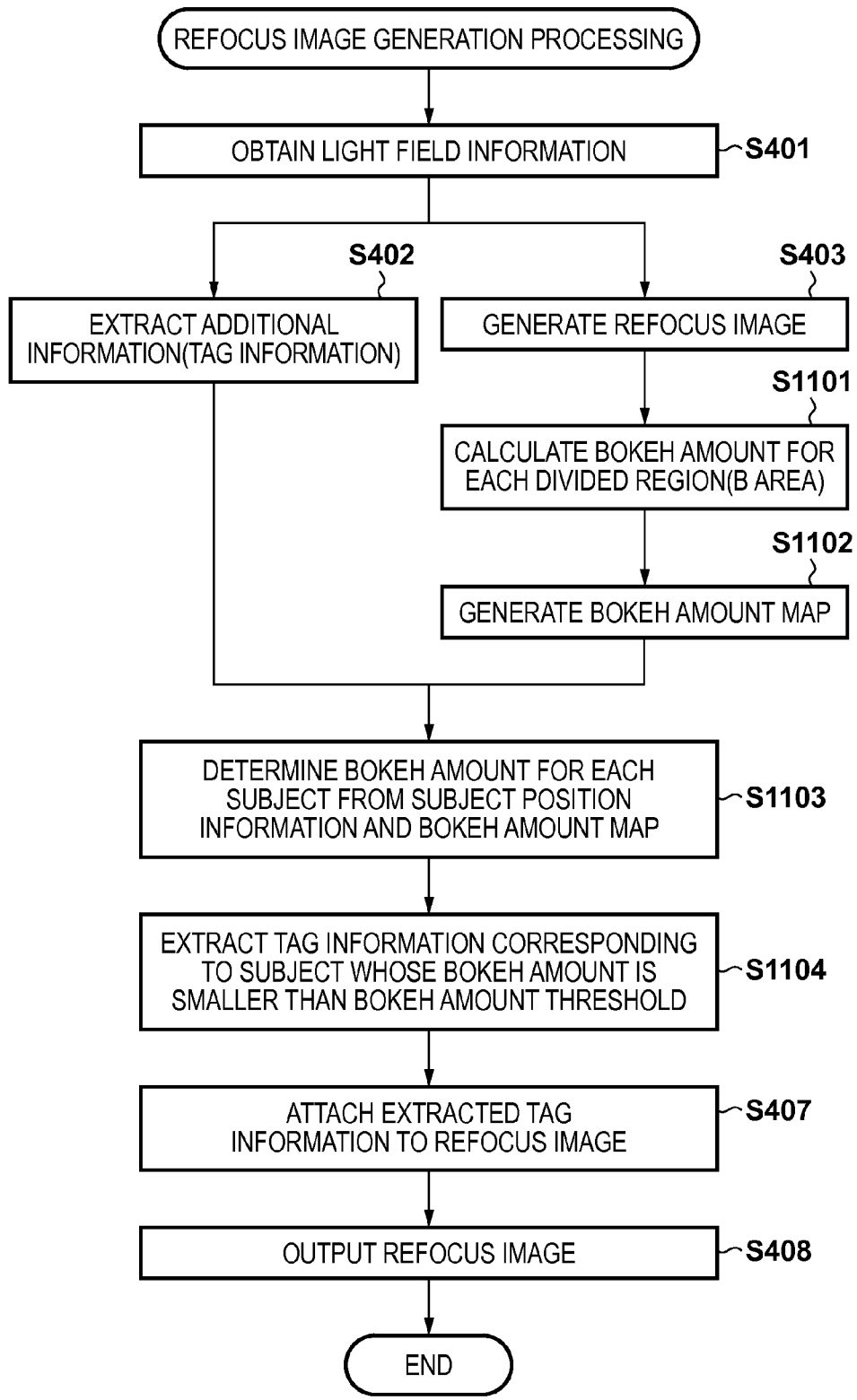

| No. | COORDINATES Start(x,y) | COORDINATES End(x,y) |
|---|---|---|
| 1 | (60,20) | (90,60) |
| 2 | (10,70) | (40,50) |
| 3 | (40,5) | (65,30) |

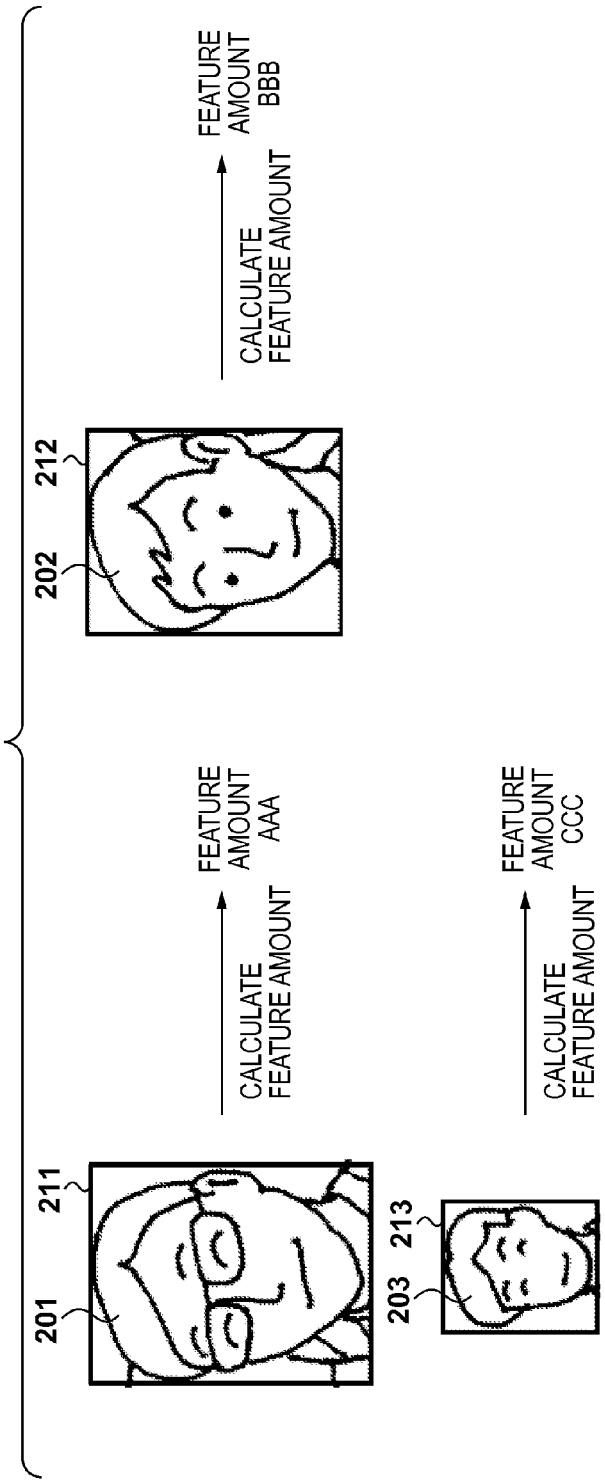

F I G. 21
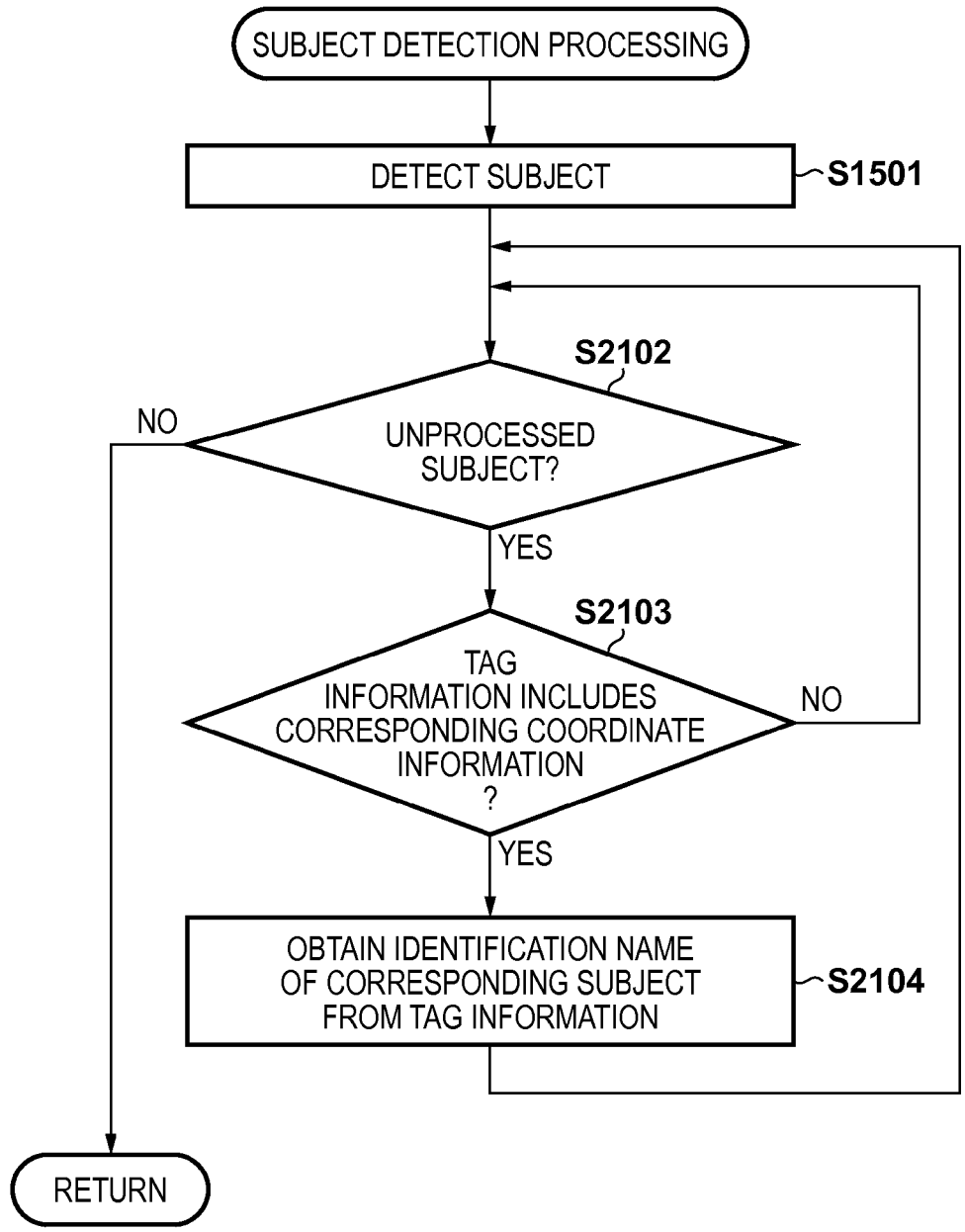

IMAGE PROCESSING APPARATUS AND METHOD FOR CONTROLLING THE SAME

BACKGROUND OF THE INVENTION

Field of the Invention

The present invention relates to an image processing apparatus and a method for controlling the same, and particularly to an image processing apparatus that handles light field information and a method for controlling the same.

Description of the Related Art

Recently, image capture apparatuses that record not only the integrated intensity of light incident on pixel locations but also the intensity in each incident direction of light incident on pixel locations have been proposed, and such image capture apparatuses are called light field cameras (Ren. Ng, et al., "Light Field Photography with a Hand-Held Plenoptic Camera", Stanford Tech Report CTSR 2005-02, 2005.4.20). For example, in a configuration in which a microlens array is disposed between an imaging lens and an image sensor so that a plurality of pixels of the image sensor receive light emitted from one microlens, the intensity of light incident on the microlens from a different direction can be obtained with each pixel.

Pixel signals (light field information) obtained in this manner have information on the intensity of incident light at a position of the microlens from the different direction. Therefore, an image (hereinafter, a refocus image) in which an arbitrary imaging plane is focused can be generated (reconstructed) by applying a method called "Light Field Photography". Thus, in the case of imaging with a light field camera, it is possible to recognize and specify a subject that was not focused (or out of focus) at the time of imaging, by generating a refocus image.

It is known that additional information (also referred to as tags), such as personal names of persons in an image or an event name related to an image, is associated with image data in order to facilitate image searches. For example, assume that light field information is associated with additional information that is obtained from a plurality of refocus images that can be generated from the light field information and in which different distances are focused.

In the case where different light field information or an image (referred to as "derivative information") is generated from light field information in this manner, the problem of which additional information should be attached to or associated with the derivative information arises. This is because in the case where the additional information associated with the original light field information is also associated with the derivative information as it is, additional information that does not correspond to the derivative information may be included.

For example, assume that all of names of subjects (herein, assumed to be persons) that can be specified in the refocusable range are associated with the original light field information as additional information, and a refocus image in which a specific distance is focused is generated as a derivative information. In this case, the additional information of the original light field information may include a name of a person who is not focused (i.e., a person who is out of focus) in the refocus image.

SUMMARY OF THE INVENTION

The present invention resolves problems such as the above that have not been examined heretofore, and provides an image processing apparatus and a method for controlling the same that are capable of associating appropriate additional information with light field information or a derivative information thereof.

According to an aspect of the present invention, there is provided an image processing apparatus for processing light field information indicating an intensity distribution of light and an incident direction of light, the image processing apparatus comprising: an image generating unit configured to generate a derivative information from the light field information; an analyzing unit configured to analyze the derivative information and obtain information representing a feature of the derivative information; an information generating unit configured to generate first additional information to be attached to the derivative information, based on the information representing the feature of the derivative information; and an attaching unit configured to attach the first additional information to the derivative information.

According to another aspect of the present invention, there is provided a method for controlling an image processing apparatus for processing light field information indicating an intensity distribution of light and an incident direction of light, the method comprising: an image generating step of generating a derivative information from the light field information; an analyzing step of analyzing the derivative information and obtaining information representing a feature of the derivative information; an information generating step of generating first additional information to be attached to the derivative information, based on the information representing the feature of the derivative information; and an attaching step of attaching the first additional information generated in the information generation step to the derivative information.

Further features of the present invention will become apparent from the following description of exemplary embodiments with reference to the attached drawings.

BRIEF DESCRIPTION OF THE DRAWINGS

FIG. 1 is a block diagram showing an example of the functional configuration of an image processing apparatus according to Embodiment 1.

FIG. 3A to 3C are diagrams schematically showing operations of an additional information editing unit in Embodiment 1.

FIG. 5 is a block diagram showing an example of the functional configuration of an image processing apparatus according to Embodiment 2.

FIGS. 7A to 7C are diagrams schematically showing examples of operations of a distance information calculating unit in Embodiment 2.

FIG. 9 is a flowchart for describing refocus image generation processing in Embodiment 2.

FIG. 11 is a flowchart for describing refocus image generation processing in Embodiment 3.

FIGS. 14A and 14B are diagrams schematically showing examples of operations of a subject recognizing unit in Embodiment 4.

FIG. 21 is a flowchart for describing subject detection processing in Embodiment 6.

DESCRIPTION OF THE EMBODIMENTS

Exemplary embodiments of the present invention will now be described in detail in accordance with the accompanying drawings.

Embodiment 1

FIG. 1 is a block diagram showing an example of the functional configuration of an image processing apparatus according to an embodiment of the present invention.

An image processing apparatus 100 is an apparatus that receives image signals (light field information) that can be refocused and that include information indicating an intensity distribution of light and an incident direction of light, as input signals, and that is capable of generating from the light field information and outputting a refocus image in which an arbitrary distance is focused.

Figure 4:
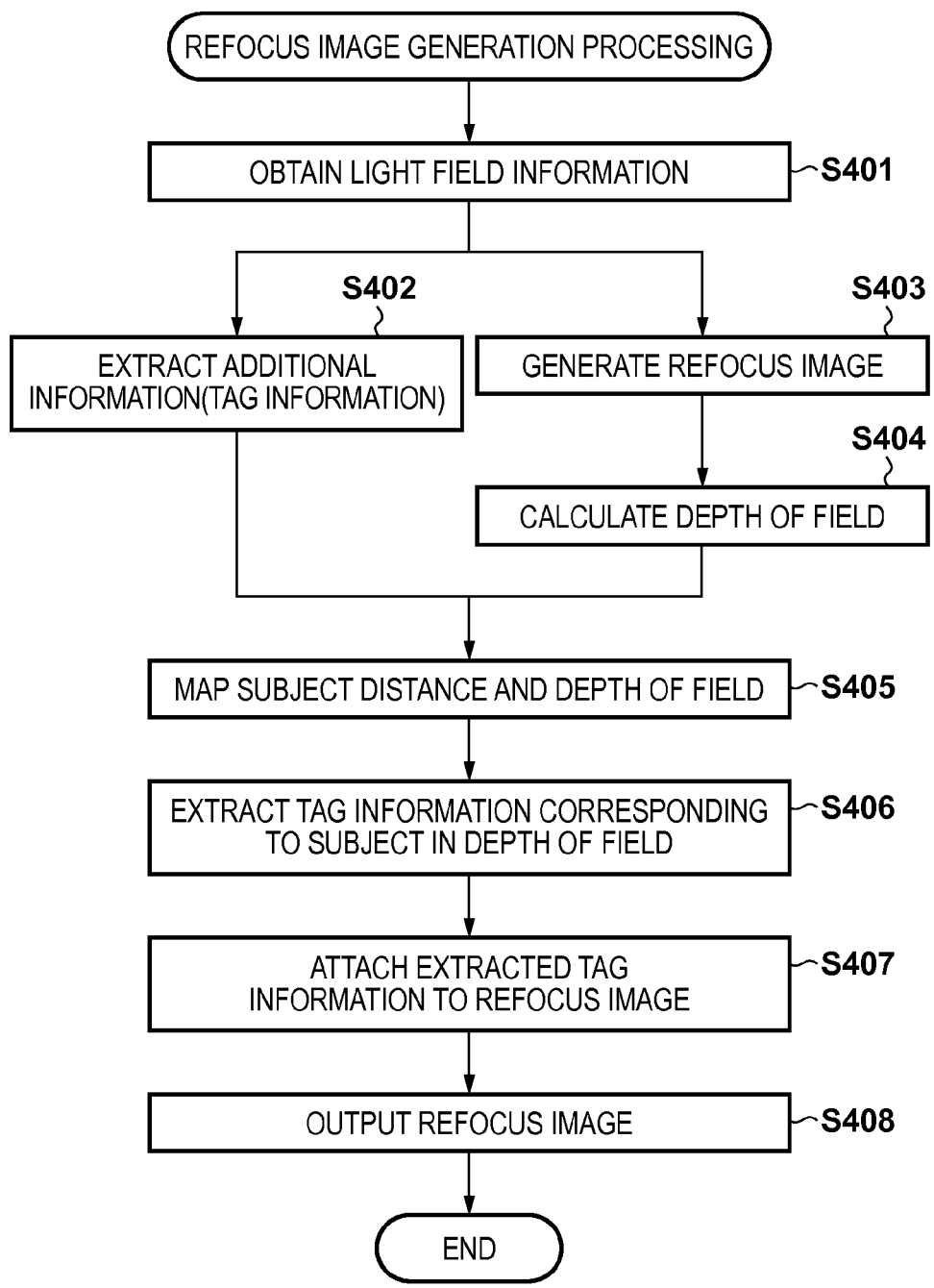
FIG. 4 is a flowchart for describing refocus image generation processing in Embodiment 1.

Hereinafter, the configuration and the operations of the image processing apparatus 100 will be described, with reference also to the flowchart shown in FIG. 4. The image processing apparatus 100 first obtains light field information 101 (step S401). For example, the light field information may be light field information that is imaged with a plurality of cameras whose viewpoints are different from each other, such as described in Japanese Patent Laid-Open No. 2011-22796. Alternatively, the light field information may be light field information that is obtained from an image sensor in which are arrayed a plurality of pixels that are provided with a plurality of sub-pixels for receiving light flux that passes through different pupil partial regions whose imaging optical systems are different from each other (refer to Ren. Ng. et al. "Light Field Photography with a Hand-Held Plenoptic Camera" described above). It is possible to obtain light field information using any known method such as these. Alternatively, the light field information may be readout from a recording medium such as a memory card or a storage device such as a hard disk, or may be obtained from another apparatus through a network. Alternatively, the light field information 101 may be obtained from an image capture apparatus that is capable of recording light field information. In this case, the image capture apparatus may be a portion of an image processing apparatus or a separate apparatus. The obtained light field information 101 is supplied to an additional information obtaining unit 111 and a derivative information generating unit 112.

Figures 2A, 2B:
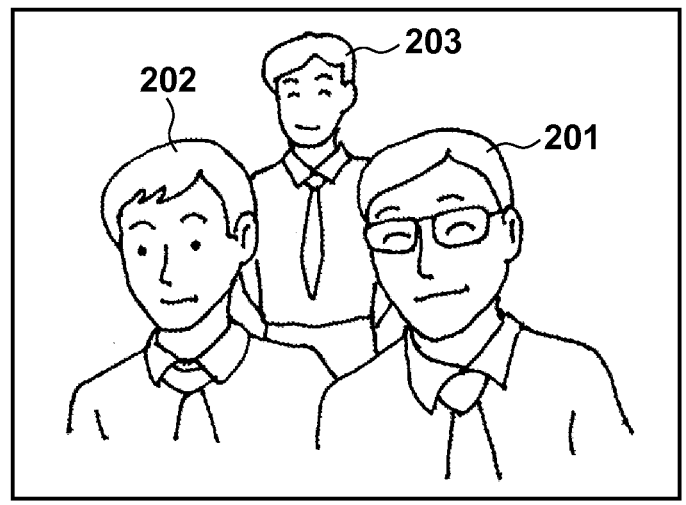
FIGS. 2A and 2B are diagrams showing examples of tag information in Embodiment 1.

The additional information obtaining unit 111 obtains additional information (hereinafter, referred to as "tag information") of the light field information 101 (step S402). It is assumed that in the present embodiment, as shown in FIGS. 2A and 2B, identification information (names and the like) and distance information about specific subjects (herein, assumed to be persons) that are detected in the refocusable range of the light field information 101 are added as tag information.

Meanwhile, a derivative information generating unit 112 generates an image based on the light field information 101 or generates other light field information (a derivative information) (step S403). It is assumed that in the present embodiment, the derivative information generating unit 112 generates an image (hereinafter, referred to as "a refocus image") in which a given distance is focused, as a derivative information. The derivative information generating unit 112 receives a focus distance that is used to generate a refocus image, from an operating unit 116. The operating unit 116 is configured with switches and the like, and is capable of receiving instructions or data input given by a user.

A derivative information analyzing unit 113 calculates the depth of field of a refocus image generated in the derivative information generating unit 112 (step S404). The derivative information analyzing unit 113 may calculate the depth of field from a focus distance used when a refocus image is generated, a focal distance (angle of view) and an aperture value of a lens when the light field information 101 is imaged, and the size of an image capture sensor of an imaging device that imaged the light field information 101, or may use another method. The information on a lens and an imaging device at the time of imaging the light field information 101 may be obtained from information added to the light field information 101 separately from tag information.

An additional information editing unit 114 then extracts specific tag information from tag information obtained by the additional information obtaining unit 111 based on the tag information obtained by the additional information obtaining unit 111 and the depth of field calculated by the derivative information analyzing unit 113 (steps S405, S406). Details will be further described using FIGS. 3A to 3C.

An additional information attaching unit 115 adds tag information that is extracted by the additional information editing unit 114 to the refocus image generated by the derivative information generating unit 112, and generates (step S407) and outputs (step S408) an output image 102. It should be noted that there are no particular limitations on the usage of output images 102, and the output images may be recorded in a recording medium, displayed on a display apparatus, sent to an external device, or applied to a combination of these usages.

Examples of the structure of tag information in the present embodiment will be described using FIGS. 2A and 2B.

FIG. 2A is a refocus image showing an example of a field of view of light field information 101 that was imaged. Although the light field information 101 itself does not represent an image, a refocus image generated from the light field information 101 is shown in FIG. 2A to facilitate understanding and description. Also, herein, it is assumed that subjects other than subjects 201 to 203 cannot be identified in the entire region of the refocusable range of the light field information 101.

One example of tag information corresponding to FIG. 2A is shown in FIG. 2B. In the tag information shown in FIG. 2B, identification names (Mr. A, Mr. B, and Mr. C) are respectively associated with pieces of distance information with regard to three subjects 201 to 203. It should be noted that the distance information is a distance (unit is arbitrary) from the imaging device that imaged the light field information 101 to the respective subjects.

Next, the operations of the additional information editing unit 114 in the present embodiment will be described using FIGS. 3A to 3C. FIG. 3A shows relationships among locations of subjects 201 to 203 at the time of imaging the light field information 101 shown in FIG. 2A where the horizontal axis indicates the distance from the imaging device.

Distances 311 to 313 respectively indicate distances from the imaging device that imaged the light field information 101 to the subjects 201 to 203. The distances 311 to 313 are respectively "30", "50", and "90", based on the tag information in FIG. 2B. Also, a focus distance 321 used when a refocus image was generated in the derivative information generating unit 112 and the depth of field 322 of the generated refocus image are shown in FIGS. 3A and 3C.

As shown in FIG. 3A, the additional information editing unit 114 maps the distance information of each subject indicated in tag information and the depth of field of a refocus image (step S405), extracts tag information of subjects that exist in the depth of field, and outputs the information to the additional information attaching unit 115 (step S406). Because a distance 311 and a distance 312 are included in the depth of field 322 in the example shown in FIGS. 3A to 3C, the additional information editing unit 114 extracts tag information on a subject 201 and a subject 202 (FIG. 3B).

It should be noted that the additional information editing unit 114 does not extract tag information on subjects whose distances are outside the depth of field in the example described above. However, tag information may be extracted by expanding the depth of field, taking into consideration that a person can be identified if the distance of a subject is near the depth of field even if the distance is outside the depth of field.

For example, as shown in FIG. 3C, margin ranges 423 and 424 are respectively added to near and far ends of the depth of field 322, and tag information on subjects included in a range of "the margin range 423+the depth of field 322+the margin range 424" may be extracted. Although tag information on new subjects is not extracted due to addition of margin ranges in the example in FIG. 3C, if there is a subject slightly forward of the subject 201 or slightly backward of the subject 202, tag information thereon is extracted. It should be noted that it is possible to set a margin range by extending at least one of near side and far side of the depth of field, and amounts of expanding the near side and far side may be the same or different. Also, the expansion amount may be changed in accordance with conditions such as an aperture value or a focus distance used in generation of a refocus image.

Thus, according to the present embodiment, additional information of light field information is extracted based on the depth of field of a refocus image, and thereby additional information appropriate for the refocus image generated from the light field information can be generated using the additional information of the light field information.

Also, because the present embodiment is configured to extract appropriate information from the additional information of light field information, there is an advantage in that lighter processing can be performed compared with generating new additional information from a refocus image.

Embodiment 2

Next, Embodiment 2 of the present invention will be described. FIG. 5 is a block diagram showing an example of the functional configuration of an image processing apparatus according to the present embodiment. The same reference numerals are given to functional blocks similar to the image processing apparatus 100 of Embodiment 1 and redundant description is omitted.

As is clear from a comparison between FIG. 1 and FIG. 5, an image processing apparatus 500 of the present embodiment is different from the image processing apparatus 100 of Embodiment 1 in newly having a distance information calculating unit 516 and in operations of an additional information editing unit 114'. Also, as described later, the format of additional information of light field information 101 is different. Therefore, these differences will be mainly described hereinafter.

Figures 6A, 6B:
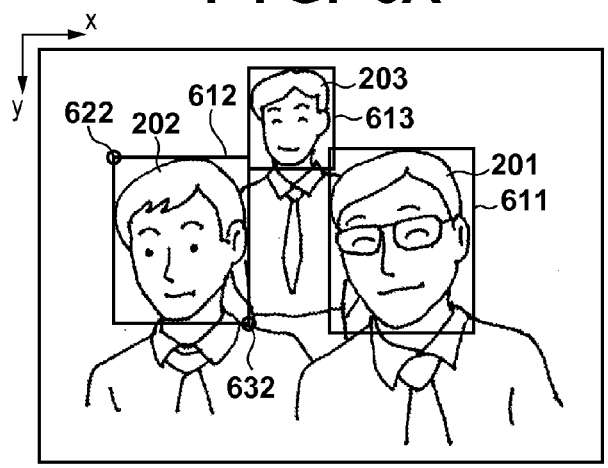
FIGS. 6A and 6B are diagrams showing examples of tag information in Embodiment 2.

First, the structure of additional information (tag information) of light field information 101 in the present embodiment will be described using FIGS. 6A and 6B. Similarly to FIG. 2A, FIG. 6A is a diagram schematically showing light field information 101 with a refocus image. Although subjects similarly to Embodiment 1 are also imaged in the present embodiment, the format of additional information is different from Embodiment 1. Specifically, as shown in FIG. 6B, tag information for subjects 201 to 203 has a format in which identification names of subjects are associated with position information on subjects in an image. Here, the position information of a subject is image coordinate information that specifies a circumscribed rectangular region in a feature region of a subject image, and it is assumed that circumscribed rectangular regions of face regions are feature regions 611 to 613 in the case where the subjects are persons. Also, it is assumed that image coordinate information that specifies feature regions is coordinate information on the opposite apexes of rectangular regions, and herein, image coordinate information is image coordinate information on the upper left apex and the lower light apex thereof.

It should be noted that feature regions of person subjects may not only be facial regions but also other regions, such as regions including the body. Also, if the subjects are animals, they may be handled similarly to person subjects. In the case where a subject is not an animal, a feature region may be a circumscribed rectangular region of the entire subject. Also, the feature region is not limited to a rectangular region, and may have another shape, such as being a circular region or a typical square region. It should be noted that the origin of image coordinates may be predetermined, or additional information may include information related to the origin location.

As shown in FIG. 6B, with regard to each subject, tag information includes an upper left corner and a lower right corner of a feature region that are respectively specified by coordinates Start (x, y) and coordinates End (x, y) as subject position information. For example, tag information on a subject 202 is associated with coordinates Start (x, y) corresponding to an upper left corner 622 of a feature region 612 and coordinates End (x, y) corresponding to a lower right corner 632 as position information.

Hereinafter, the configuration and operations of an image processing apparatus 500 will be described focusing on differences from Embodiment 1, with reference also to a flowchart shown in FIG. 9. The same reference numerals are given to processing steps in FIG. 9 that are similar to Embodiment 1 and redundant description is omitted.

A distance information calculating unit 516 generates a distance map from light field information 101 (steps S901, S902). The operations of the distance information calculating unit 516 will be described later using FIGS. 7A to 7C.

An additional information editing unit 114' extracts specific tag information based on a depth of field calculated by a derivative information analyzing unit 113, tag information obtained by an additional information obtaining unit 111, and a distance map generated by a distance information calculating unit 516 (steps S903, S405 to S406). Details will be described later using FIGS. 7C, 8A and 8B.

The operations of the distance information calculating unit 516 will be described in detail. The distance information calculating unit 516 divides a region of a refocus image to be generated by light field information 101 into a plurality of predetermined distance information obtaining areas (referred to as "D areas") 701, as shown in FIG. 7A. Here, the divided number of D areas 701 can be appropriately determined in accordance with the arithmetic capacity of the image processing apparatus 500, the size of a refocus image to be generated from light field information 101, or the like.

The distance information calculating unit 516 then calculates one subject distance for each D area 701 using light field information 101 corresponding to the D area 701 (step S901). There is no particular limitation on the method for calculation, and for example, a plurality of refocus images having different focus distances may be generated using a derivative information generating unit 112 to determine contrast values of an image in the D area 701, or a position in the D area 701 at which each pixel location is focused may be determined from light field information 101.

A subject distance may be a distance to a subject that is located at the center of the D area 701, or may be an average value of subject distances in the D area 701. The distance information calculating unit 516 then generates a distance map in which the distribution of subject distances in the imaging range is indicated in D area 701 units (step S902). FIG. 7B is a diagram schematically showing a distance map, and D areas filled in with the same pattern indicate the same subject distances. Therefore, regions 711, 712 and 713 are respectively configured with D areas having the same subject distance.

Next, the operations of the additional information editing unit 114' will be described in detail. The additional information editing unit 114' determines distance information for each subject from subject position information included in tag information and a distance map generated by the distance information calculating unit 516 (step S903). Specifically, as shown in FIG. 7C, the additional information editing unit 114' obtains the corresponding subject distances for feature regions 611, 612 and 613 of subjects from distance maps, and sets the subject distance included the most to be the distance of the feature regions (the subject distance of subjects 201 to 203).

In the example of FIG. 7C, the feature region 611 mostly overlaps the region 711, the feature region 612 mostly overlaps the region 712 and the feature region 613 mostly overlaps the region 713. Therefore, the additional information editing unit 114' sets the distance of the subject 201 to be a subject distance of the region 711, the distance of the subject 202 to be a subject distance of the region 712, and the distance of the subject 203 to be a subject distance of the region 713.

It should be noted that a distance to the feature region using a distance map may be determined with other methods. The distances can be determined with other arbitrary methods such as, for example, taking a weighted average of subject distances that are included in feature regions using weights corresponding to overlapped areas, or representing a subject distance that is included in a feature region with a subject distance of the central portion of the feature region.

Similarly to Embodiment 1, the additional information editing unit 114' then extracts specific tag information among pieces of tag information of the light field information 101 from the depth of field calculated by the derivative information analyzing unit 113 in step S404 and the distances that are indicated in tag information and determined for each subject in step S903.

Figures 8A, 8B:
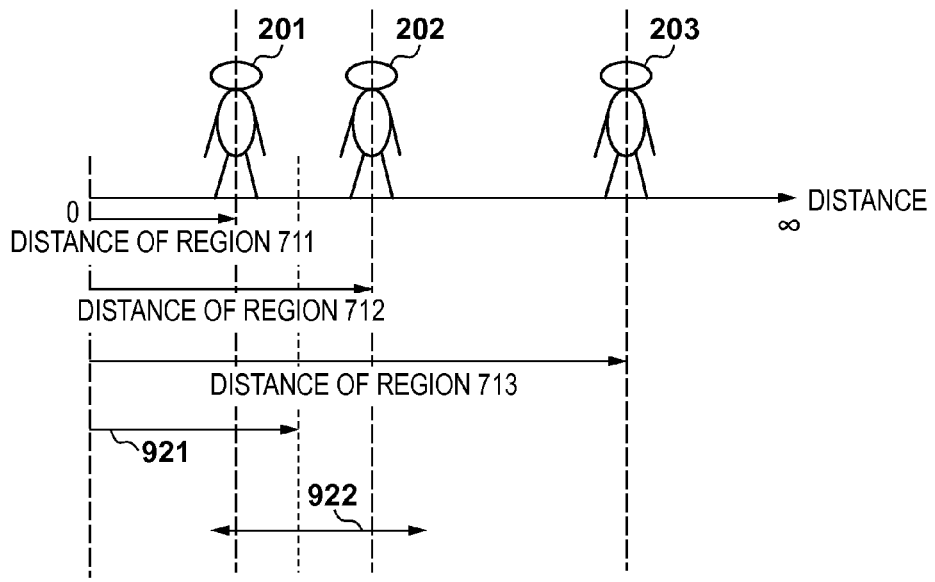
FIGS. 8A and 8B are diagrams schematically showing examples of operations of additional information editing unit in Embodiment 2.

FIG. 8A shows a relationship between subject positions for the subjects 201 to 203 and distances determined using a distance map in the present embodiment, similarly to FIG. 3A. A focus distance 921 indicates a focus distance used when a refocus image is generated in the derivative information generating unit 112. A depth of field 922 indicates the depth of field of a refocus image calculated by the derivative information analyzing unit 113.

As shown in FIG. 8A, the additional information editing unit 114' maps distances (distances of regions 711 to 713 in a distance map) determined for feature regions 611 to 613 of subjects 201 to 203 and the depth of field of the refocus image (step S405). The additional information editing unit 114' then extracts tag information on subjects present in the depth of field (step S406). In the example shown in FIG. 8A, because subjects 201 and 202 are included in the depth of field 922, the additional information editing unit 114' extracts tag information on the subjects 201 and 202 from additional information of light field information 101, and outputs the tag information to an additional information attaching unit 115 (FIG. 8B).

The subsequent operations of the additional information attaching unit 115 are similar to Embodiment 1 (steps S407 and S408).

Also in the present embodiment, additional information on light field information is extracted based on the depth of field of a refocus image, and thereby it is possible to generate additional information that is appropriate for a refocus image generated from light field information, using additional information of the light field information.

Also, because the present embodiment is configured to extract appropriate information from additional information of light field information, there is an advantage in that lighter processing can be performed compared with generating new additional information from a refocus image.

Embodiment 3

Next, Embodiment 3 of the present invention will be described. Because an image processing apparatus of the present embodiment has a functional configuration similar to the image processing apparatus 100 shown in FIG. 1 except for a derivative information analyzing unit and an additional information editing unit operating differently, a functional block diagram is omitted. However, the image processing apparatus of the present embodiment is distinguished as 110", the derivative information analyzing unit is distinguished as 113" and the additional information editing unit is distinguished as 114".

Because the structure of tag information of light field information 101 in Embodiment 3 is similar to the description given with reference to FIGS. 6A and 6B in Embodiment 2, description is omitted herein.

Hereinafter, the configuration and the operations of the image processing apparatus 100" will be described focusing on differences from Embodiment 1, with reference also to a flowchart shown in FIG. 11. The same reference numerals are given to processing steps in FIG. 11 that are similar to Embodiment 1 and redundant description is omitted.

A derivative information analyzing unit 113" calculates an amount of bokeh of a refocus image generated in the derivative information generating unit 112, and generates a bokeh amount map (steps S1101 to S1102). Examples of calculating an amount of bokeh will be described later using FIGS. 10A to 10C.

The additional information editing unit 114" extracts specific tag information from the tag information obtained by the additional information obtaining unit 111, based on the tag information obtained by the additional information obtaining unit 111 and the bokeh amount map generated by the derivative information analyzing unit 113" (steps S1103 to S1104). Details will be described later using FIGS. 10A to 10C.

Figure 10A:
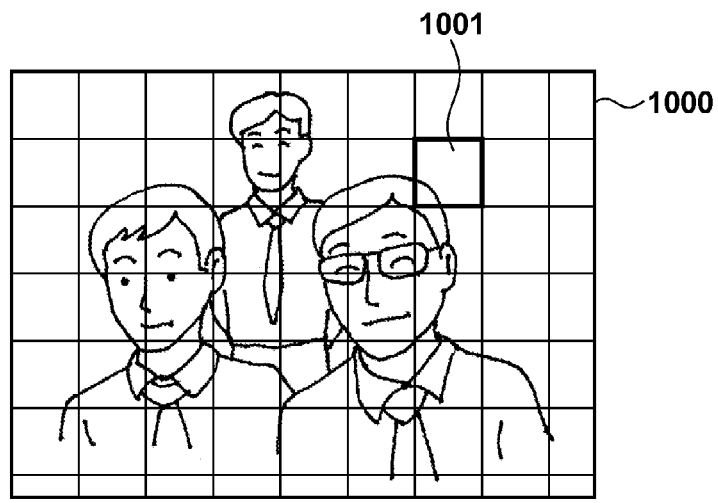
FIGS. 10A to 10C are diagrams schematically showing examples of operations of a derivative information analyzing unit in Embodiment 3.
Figure 10B:
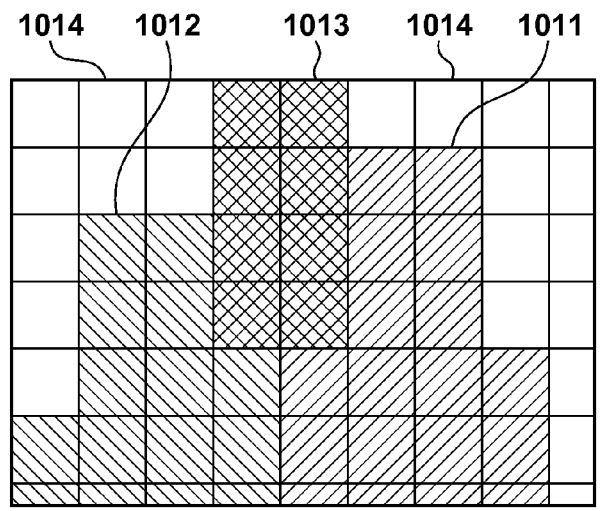

The operations of the derivative information analyzing unit 113" in Embodiment 3 will be described using FIGS. 10A to 10C.

The derivative information analyzing unit 113" first divides a refocus image 1000 into predetermined bokeh amount calculating areas (hereinafter, referred to as "B areas"). FIG. 10A shows an example in which the refocus image 1000 is divided into a plurality of B areas 1001, similarly to D areas in Embodiment 2. Here, the divided number of B areas 1001 can be appropriately determined in accordance with the arithmetic capacity of the image processing apparatus 100", the image size of a refocus image 1000, or the like.

The derivative information analyzing unit 113" calculates an amount of bokeh for each B area 1001 of the refocus image 1000 (step S1101). Although there is no particular limitation on the method for calculating the amount of bokeh, a high pass filter is applied to B areas 1001 and amounts of bokeh can be determined in accordance with (a size, an average value, and the like of) pixel values to which the filter has been applied. Because a high pass filter is a filter that emphasizes high frequency components, a difference between the minimum value and the maximum value of pixel values after filter processing becomes small in the case where an amount of bokeh is large. It should be noted that besides a method in which a high pass filter is applied thereto, contrast values of the B areas 1001 may be calculated and the amount of bokeh may be determined to be larger as the contrast decreases. Also, other methods may be used, such as determining an edge width.

The derivative information analyzing unit 113" generates a bokeh amount map from an amount of bokeh for each B area 1001 (step S1102). FIG. 10B schematically shows a bokeh amount map in which the distribution of amounts of bokeh in the imaging range is indicated in B area units and B areas filled in with the same pattern indicate that amounts of bokeh are the same. Thus, regions 1011 to 1014 are respectively configured with B areas having the same amount of bokeh. Here, the magnitude relationship in an amount of bokeh is assumed to be a bokeh amount of the region 1011<a bokeh amount of the region 1012<a bokeh amount of the region 1013<a bokeh amount of the region 1014.

The operations of the additional information editing unit 114" in Embodiment 3 will be described using FIG. 10C. The additional information editing unit 114" first determines an amount of bokeh for each subject from subject position information included in tag information and a bokeh amount map generated by the derivative information generating unit 112' (step S1103). Specifically, as shown in FIG. 10C, the additional information editing unit 114" obtains the corresponding amounts of bokeh for feature regions 611, 612 and 613 of subjects from a bokeh amount map, and sets amounts of bokeh included the most to be amounts of bokeh of the feature regions (subjects 201 to 203).

Figure 10C:
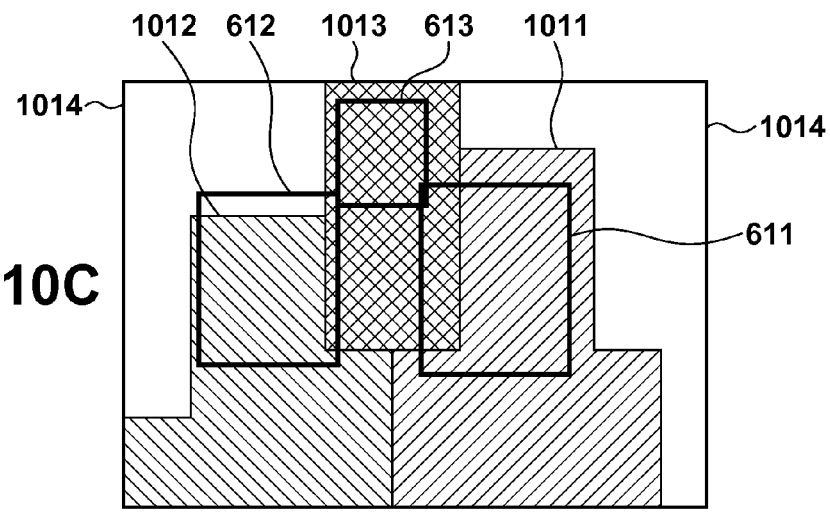

In the example of FIG. 10C, the feature region 611 mostly overlaps the region 1011, the feature region 612 mostly overlaps the region 1012 and the feature region 613 mostly overlaps the region 1013. Thus, the additional information editing unit 114" determines that a bokeh amount of the subject 201 is a bokeh amount of the region 1011, a bokeh amount of the subject 202 is a bokeh amount of the region 1012, and a bokeh amount of the subject 203 is a bokeh amount of the region 713.

It should be noted that a distance to the feature region using a bokeh amount map may be determined with other methods. The distance can be determined with other arbitrary methods such as, for example, taking a weighted average of bokeh amounts that are included in feature regions using weights corresponding to overlapped areas, or representing a bokeh amount that is included in a feature region with a bokeh amount of the central portion of the feature region.

The additional information editing unit 114" extracts specific tag information, based on tag information of the light field information 101 from the depth of field calculated by the derivative information analyzing unit 113 and amounts of bokeh for respective subjects indicated in the tag information. Specifically, the additional information editing unit 114" holds a threshold of an amount of bokeh (hereinafter, referred to as "bokeh amount threshold"), and extracts tag information on a subject having a smaller bokeh amount than the bokeh amount threshold (step S1104). For example, in the case where a bokeh amount of the region 1011<a bokeh amount of the region 1012<a bokeh amount of the region 1013<a bokeh amount of the region 1014, the additional information editing unit 114" extracts information on the objects 601 and 602 from the tag information obtained by the additional information obtaining unit 111.

Here, the additional information editing unit 114" may not hold a bokeh amount threshold. A bokeh amount threshold can be set through the operating unit 116, or it is possible to change the value of a bokeh amount threshold in accordance with conditions such as the resolution of a refocus image.

The subsequent operations of the additional information attaching unit 115 are similar to Embodiment 1 (steps S407 and S408).

Additional information of light field information is extracted based on an amount of bokeh for a refocus image, and thereby also with the present embodiment, additional information that is appropriate for the refocus image generated from light field information can be generated using the additional information of light field information.

Also, because the present embodiment is configured to extract appropriate information from additional information of light field information, there is an advantage in that lighter processing can be performed compared with generating new additional information from a refocus image.

Embodiment 4

Next, Embodiment 4 of the present invention will be described. In Embodiments 1 to 3, tag information that is appropriate for a refocus image is extracted from the tag information added to the light field information 101. The present embodiment has a configuration in which tag information is generated without using tag information of the light field information 101.

Figure 12:
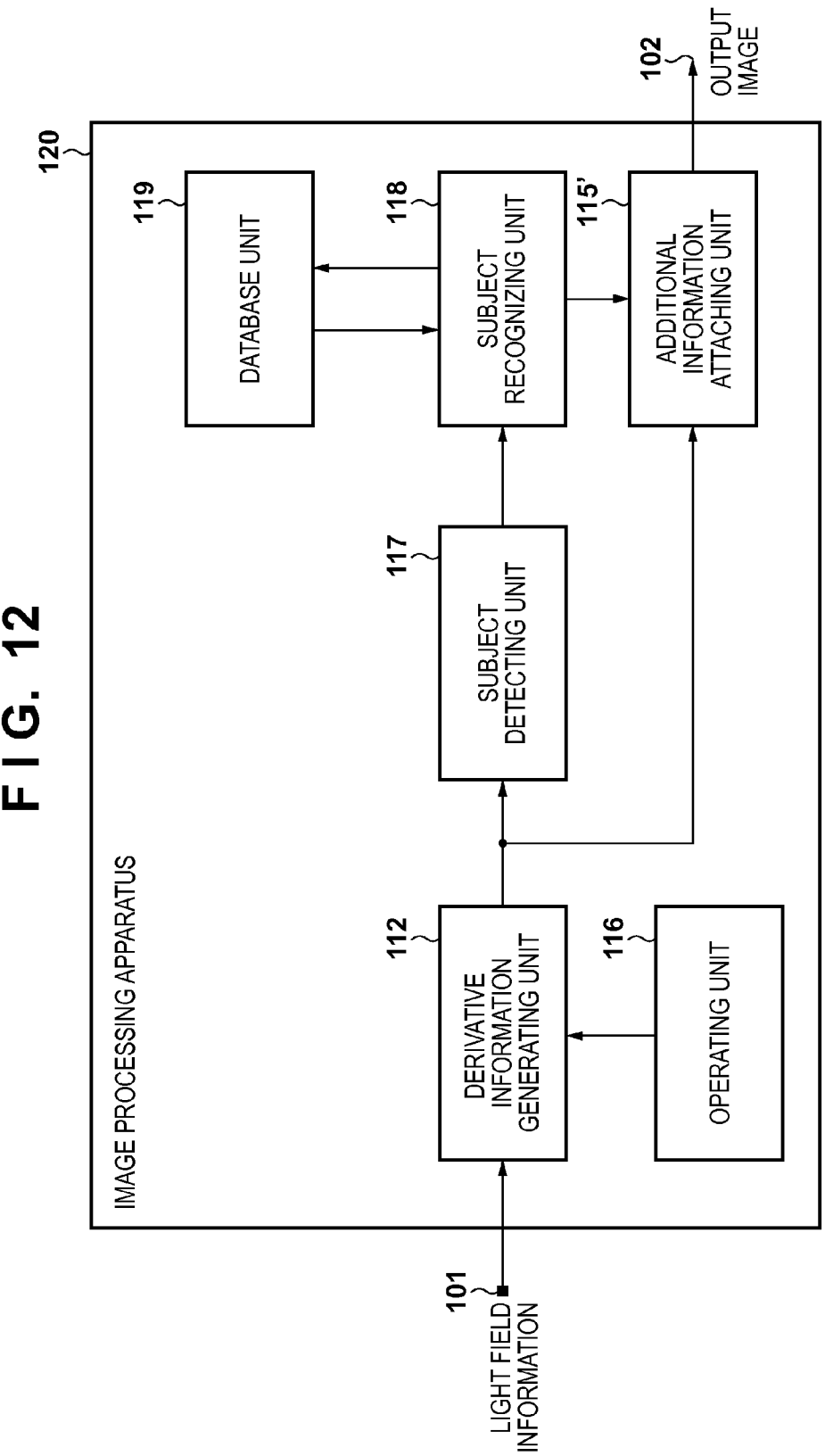
FIG. 12 is a block diagram showing an example of the functional configuration of an image processing apparatus according to Embodiment 4.
Figure 15:
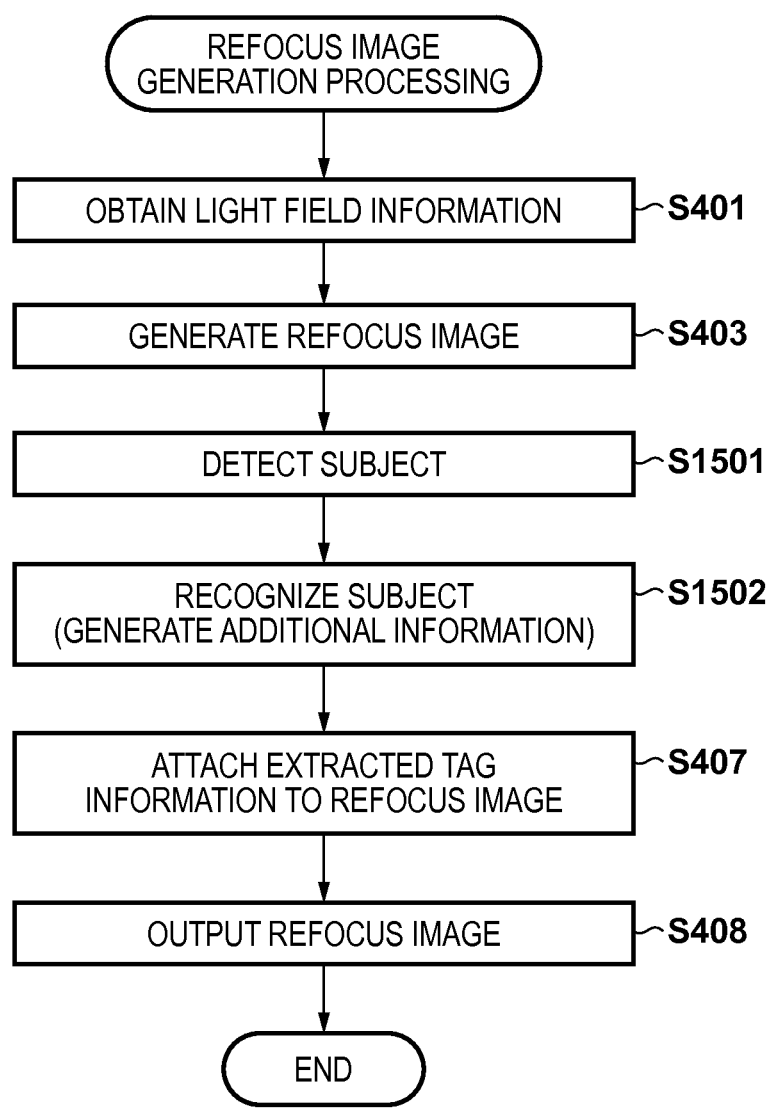
FIG. 15 is a flowchart for describing refocus image generation processing in Embodiment 4.

FIG. 12 is a block diagram showing an example of the functional configuration of an image processing apparatus 120 according to the present embodiment. In FIG. 12, the same reference numerals are given to functional configurations similar to the image processing apparatus 100 shown in FIG. 1 and redundant description is omitted. Hereinafter, the configuration and the operations of the image processing apparatus 120 will be described focusing on differences from Embodiment 1, with reference also to a flowchart shown in FIG. 15. The same reference numerals are given to processing steps in FIG. 15 that are similar to Embodiment 1 and redundant description is omitted.

A subject detecting unit 117 detects a plurality of subjects from a refocus image generated by a derivative information generating unit 112, and outputs information on detected subjects (hereinafter, referred to as "subject detection information") (step S1501). For example, in the case where a subject is a person, the subject detecting unit 117 can set the face of the person as a detection target, and output coordinates of a facial region to a subject recognizing unit 118 as subject detection information. Alternatively, the subject detecting unit 117 may, for example, cut out an image of a facial region from the refocus image, and output the image to the subject detecting unit 117 as subject detecting information.

The subject recognizing unit 118 recognizes subjects detected by the subject detecting unit 117, using information that is prepared in advance in a database unit 119, and outputs identification information on subjects to an additional information attaching unit 115 as additional information (step S1502). For example, the subject recognizing unit 118 calculates a feature amount from image regions of the subjects detected in the subject detecting unit 117, and refers to the database unit 119 in which identification information on recognized subjects and feature amounts thereof are stored in association with each other, and thereby recognizes subjects.

An example of the operations of the subject detecting unit 117 in Embodiment 4 will be described using FIGS. 13A and 13B.

Figures 13A, 13B:
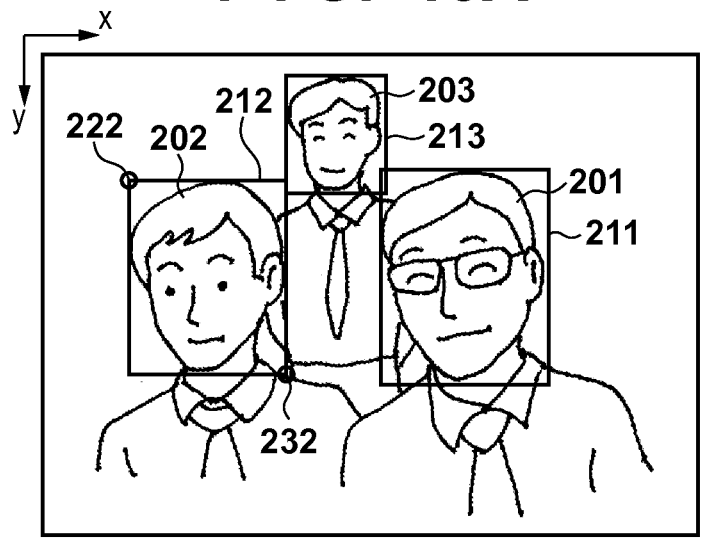
FIGS. 13A and 13B are diagrams showing examples of tag information in Embodiment 4.

An example of a refocus image in which subjects that are similar to Embodiment 1 are imaged is shown in FIG. 13A. The subject detecting unit 117 detects facial regions as subject regions from a refocus image in FIG. 13A, and outputs the position information as subject detection information. Here, it is assumed that position information on subjects is image coordinate information that specifies circumscribed rectangular regions 211 to 213 of facial regions of the subjects, and here, position information is image coordinate information on upper left and lower right apexes.

It should be noted that feature regions of person subjects may not only be facial regions but also other regions such as regions including the body. Also, if the subjects are animals, they may be handled similarly to person subjects. In the case where a subject is not an animal, a feature region may be a circumscribed rectangular region of the entire subject. Also, the feature region is not limited to a rectangular region, and may have another shape, such as being a circular region or a typical square region. It should be noted that the origin of image coordinates may be predetermined, or additional information may include information related to the origin location.

FIG. 13B illustrates subject information output by the subject detecting unit 117. As shown in FIG. 13B, the subject detecting unit 117 outputs coordinate information that specifies coordinates of each detected facial region. Coordinate information includes coordinates Start (x, y) of an upper left corner and coordinates End (x, y) of a lower right corner, as position information on respective circumscribed rectangular regions 211 to 213. Because subjects are not recognized in this state, serial numbers of facial regions are associated with pairs of coordinates.

An example of the operations of the subject recognizing unit 118 in Embodiment 4 will be described using FIGS. 14A and 14B.

The subject recognizing unit 118 determines a feature amount for each facial region of a refocus image, based on position information on subject regions (facial regions) obtained from the subject detecting unit 117. Here, although feature amounts are values indicating personal differences in images of faces, and may, for example, be values described in Japanese Patent Laid-Open No. 2001-256496, arbitrary values that can be obtained from facial regions and used in personal identification can be used as feature amounts.

FIG. 14A schematically illustrates processing of calculating feature amounts, and indicates that a feature amount AAA, a feature amount BBB, and a feature amount CCC are obtained from subjects 201, 202, and 203 respectively. Upon calculating feature amounts, the subject recognizing unit 118 searches the database unit 119 using the feature amounts.

As shown in FIG. 14B, recognition data in which identification names (for example, names) are associated with feature amounts with regard to a plurality of subjects is prepared in advance in the database unit 119 in the present embodiment. It should be noted that it is not necessary for the image processing apparatus 120 to include the database unit 119, and the database unit 119 may be present in any arbitrary location that the image processing apparatus 120 can access.

The subject recognizing unit 118 makes an inquiry to the database unit 119 using the calculated feature amount as a query, and obtains one identification name whose feature amounts match the query or that is associated with feature amounts having a degree of similarity that is greater than or equal to a threshold. For example, because a feature amount of the subject 201 is AAA, a feature amount of the subject 202 is BBB and a feature amount of the subject 203 is CCC, the subject recognizing unit 118 obtains an identification name "Mr. A" for the subject 201, an identification name "Mr. B" for the subject 202 and an identification name "Mr. C" for the subject 203, as recognition results.

In the case where feature amounts having a degree of similarity that is greater than or equal to a threshold are not present in the database unit 119 and identification names cannot be obtained, a specific identification name such as "not applicable" may serve as a recognition result. Alternatively, a user may be allowed to input an identification name while facial regions are presented. In this case, an identification name input by a user may be used as recognition results and added to the database unit 119 in association with the corresponding feature amounts as new recognition data.

The subject recognizing unit 118 outputs recognition results obtained in this manner to the additional information attaching unit 115. The additional information attaching unit 115 attaches recognition results (identification names of subjects) obtained from the subject recognizing unit 118 to a refocus image as additional information and outputs the additional information.

According to the present embodiment, additional information is generated from a refocus image, and thereby appropriate additional information can be attached to a refocus image.

Also, because the present embodiment does not use additional information of light field information, there is an advantage in that appropriate additional information can be attached to a refocus image even in a case where additional information is not added to light field information or in a case where additional information cannot be used for some reasons.

Embodiment 5

Figure 16:
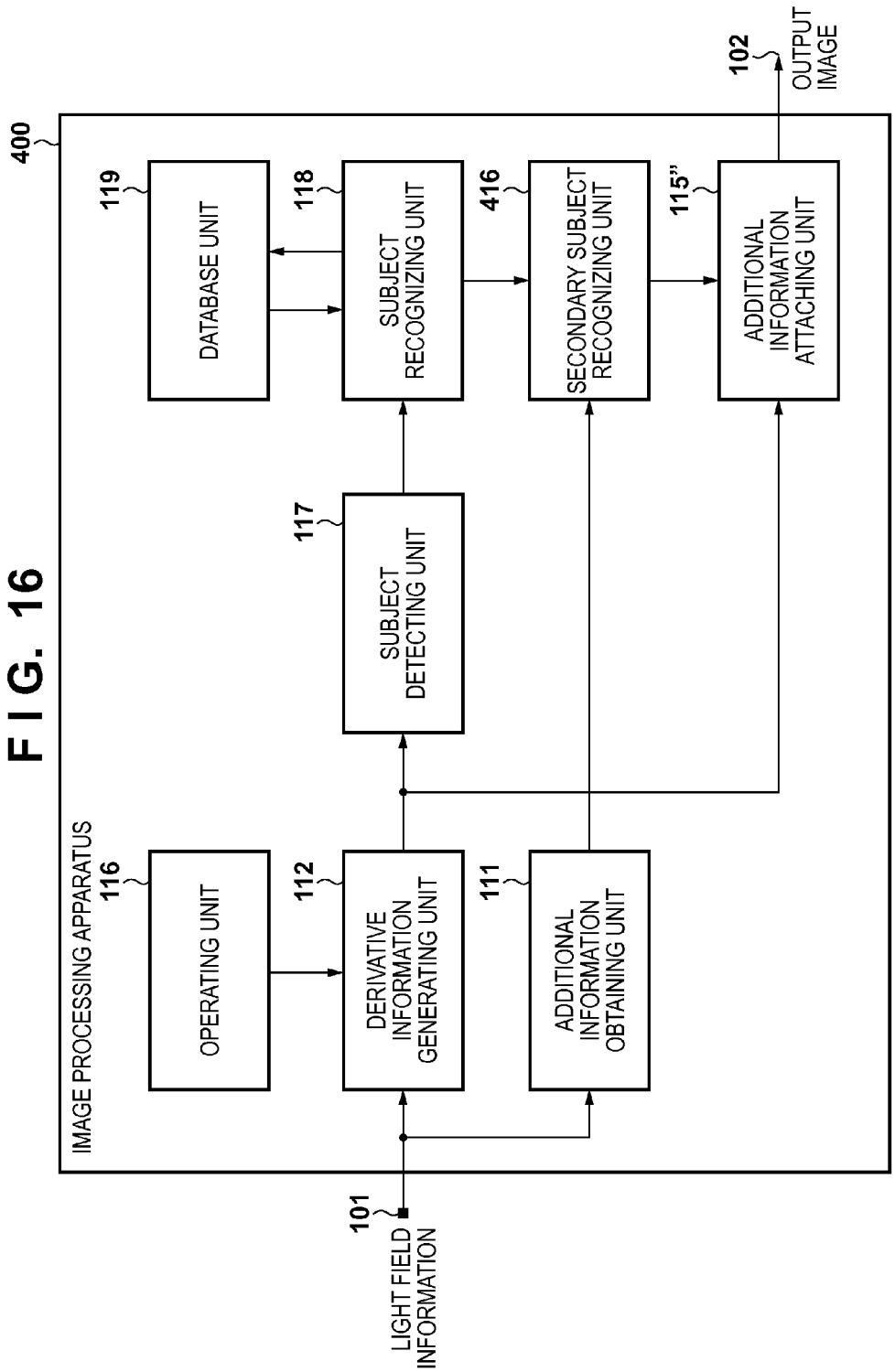
FIG. 16 is a block diagram showing an example of the functional configuration of an image processing apparatus according to Embodiment 5.

Next, Embodiment 5 of the present invention will be described. FIG. 16 is a block diagram showing an example of the functional configuration of an image processing apparatus 400 according to the present embodiment. In FIG. 16, the same reference numerals are given to functional configurations similar to the image processing apparatus 100 shown in FIG. 1 or the image processing apparatus 120 shown in FIG. 12, and redundant description is omitted. Hereinafter, the configuration and the operations of the image processing apparatus 400 will be described focusing on differences from Embodiment 1 and 4, with reference also to a flowchart shown in FIG. 17. The same reference numerals are given to processing steps in FIG. 17 that are similar to Embodiment 1 or 4, and redundant description is omitted.

A secondary subject recognizing unit 416 performs check processing on additional information generated by a subject recognizing unit 118 (step S1710). The additional information check processing is processing in which subject recognition processing is executed on subjects that cannot be recognized by the subject recognizing unit 118 based on tag information that is extracted by the additional information obtaining unit 111 from light field information 101, and additional information is updated. Details will be described later using FIG. 18.

It is assumed that in the present embodiment, tag information described using FIGS. 6A and 6B in Embodiment 2, or tag information in which position information on subjects is omitted from the tag information shown in FIGS. 6A and 6B is added to light field information 101.

Also, it is assumed that database unit 119 stores data other than recognition data of Mr. C among pieces of recognition data shown in FIG. 14B, and a refocus image is the same as the image shown in FIG. 13A. Also, it is assumed that feature amounts that are calculated by the subject recognizing unit 118 for subjects 201 to 203 are the same as feature amounts in Embodiment 4 shown in FIGS. 14A and 14B.

Because the database unit 119 of the present embodiment does not have recognition data related to Mr. C, an identification name cannot be obtained even if the subject recognizing unit 118 makes inquiry to the database unit 119 using a feature amount CCC determined for the subject 203 as a query. In this case, similarly to Embodiment 4, the subject recognizing unit 118 outputs "not applicable" as the recognition result.

Figure 17:
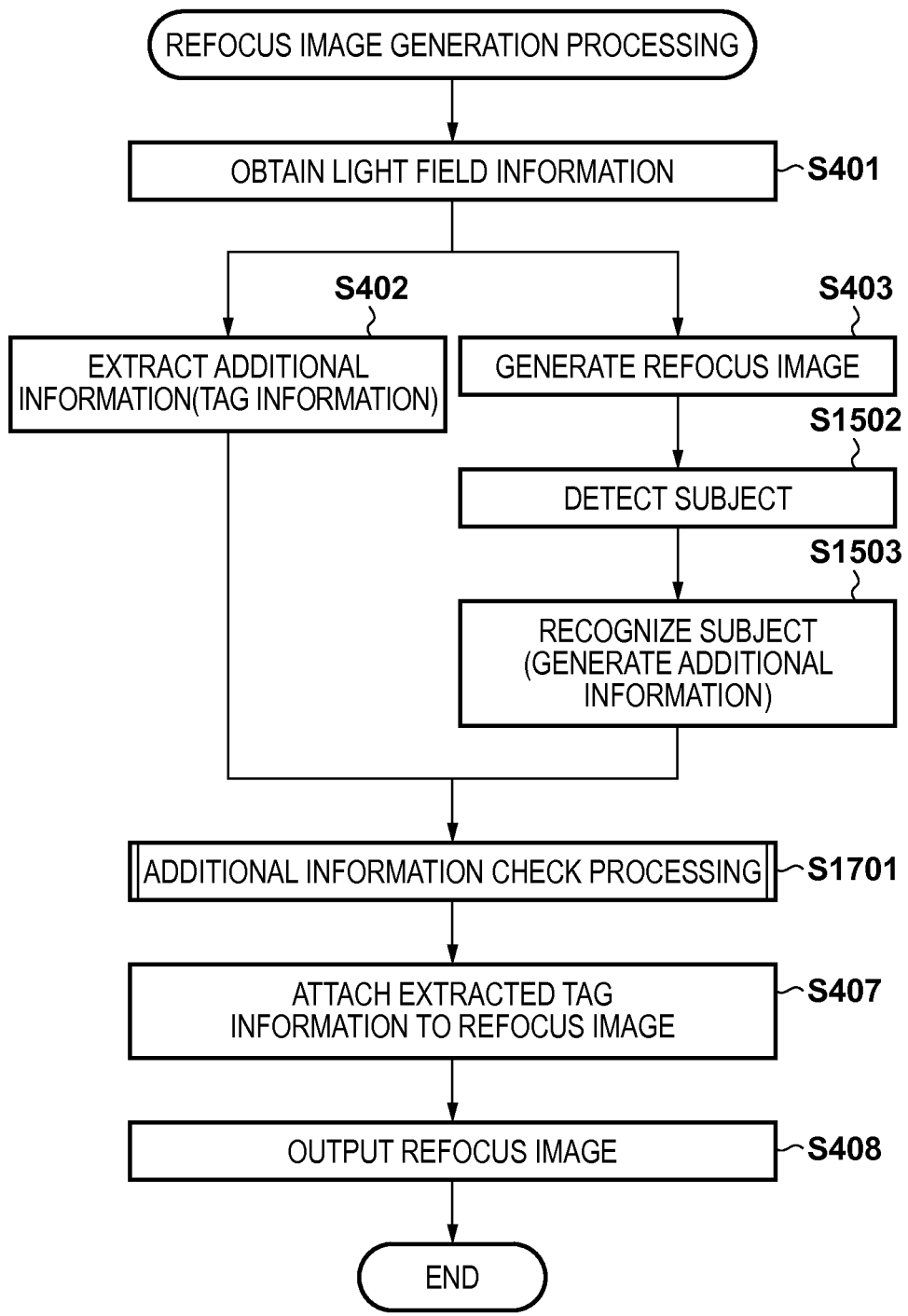
FIG. 17 is a flowchart for describing refocus image generation processing in Embodiment 5.
Figure 18:
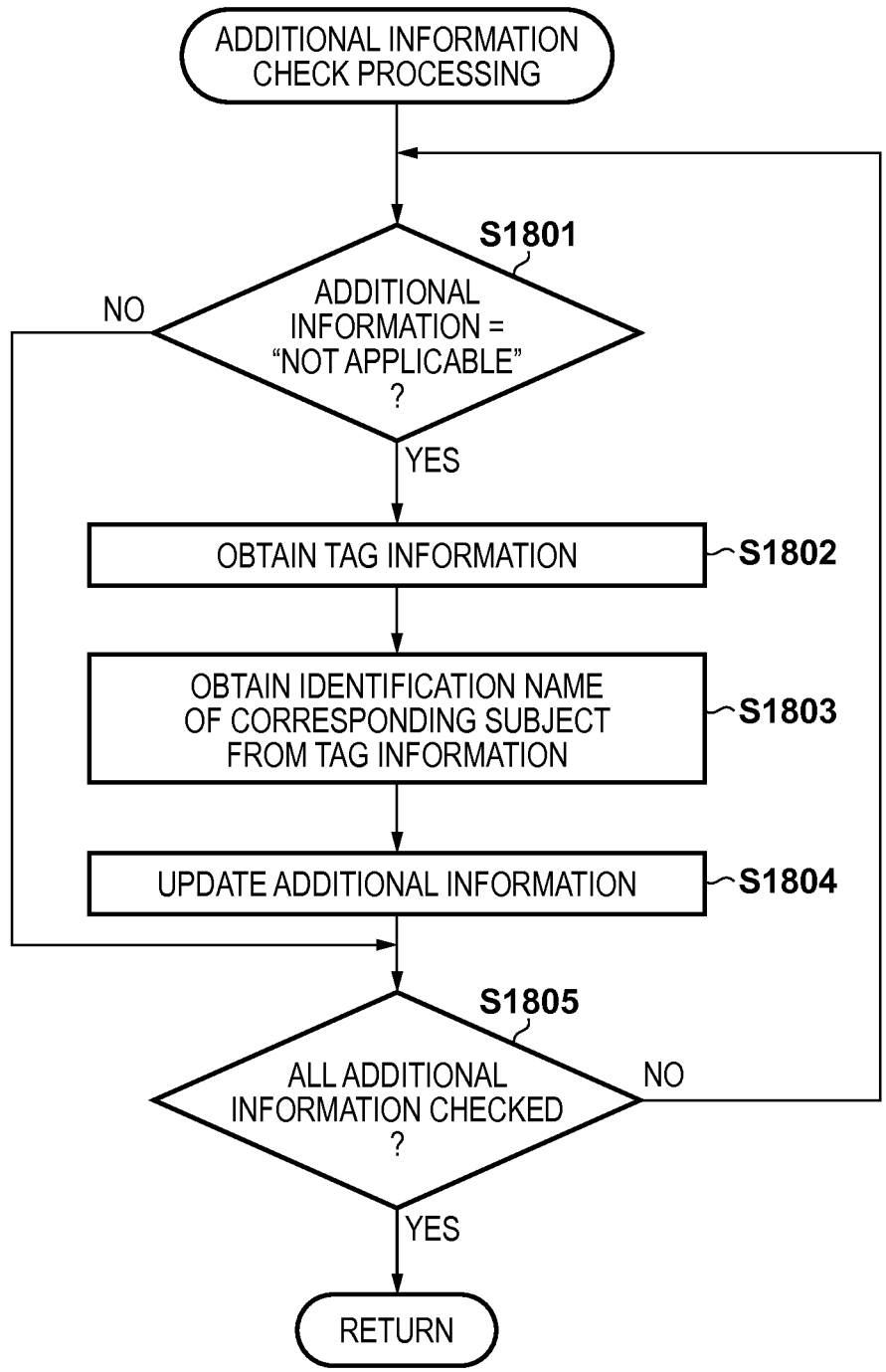
FIG. 18 is a flowchart for describing additional information check processing in Embodiment 5.

An example of the additional information check processing performed by the secondary subject recognizing unit 416 in step S1701 of FIG. 17 will be described in detail, using the flowchart shown in FIG. 18. The secondary subject recognizing unit 416 executes additional information check processing on recognition results (additional information) received from the subject recognizing unit 118 using tag information.

The secondary subject recognizing unit 416 determines, in step S1801, whether or not first additional information received from the subject recognizing unit 118 is "not applicable", and moves the processing to step S1802 in the case of YES. In the case of determining NO, the secondary subject recognizing unit 416 moves the processing to step S1805. The secondary subject recognizing unit 416 examines, in step S1805, whether there is additional information that has not been checked, and if there is additional information that has not been checked, the secondary subject recognizing unit 416 returns the processing to step S1801, and if there is no additional information that has not been checked, ends check processing and outputs additional information to the additional information attaching unit 115.

In step S1802, the secondary subject recognizing unit 416 obtains tag information extracted from the light field information 101, from the additional information obtaining unit 111.

In step S1803, the secondary subject recognizing unit 416 obtains identification names of subjects that were detected in a refocus image but whose recognition data does not exist in the database unit 119, among pieces of tag information obtained in step S1802.

Although there is no particular limitation on the method for obtaining identification names, similarly to reference to the database 119, a corresponding identification name can be identified by searching tag information using a feature amount corresponding to an identification name "not applicable", as long as tag information extracted from the light field information 101 includes information on feature amounts. Also, as shown in FIGS. 6A and 6B, if tag information includes position information on each subject, identification names of subjects whose positions match subject positions in a refocus image, or that have overlapped amounts or ratios of feature regions that are greater than or equal to a threshold may be obtained.

Also, in the case where there is no available information, if only one subject is not recognized by the subject recognizing unit 118 among subjects whose information is included in tag information, the subject can be specified as a subject corresponding to "not applicable". This is because tag information of the light field information 101 usually includes information on all subjects detected in the refocusable region.

Naturally, a method is not limited to automatic determination performed by an image processing apparatus, and a configuration that causes a user to designate subjects may be possible. For example, a list of identification names that are included in tag information extracted from light field information may be displayed on a display unit of an image processing apparatus so as to be selected by the operating unit 116, for example, and identification names selected by a user may be obtained. When a list of identification names is displayed, identification names recognized by the subject recognizing unit 118 may be excluded, or marks and the like indicating the recognition may be displayed.

In the case where an image processing apparatus cannot automatically perform determination, a plurality of methods may be combined so that a user is caused to designate subjects, and the like.

Accordingly, upon obtaining identification names of subjects that could not be recognized by the subject recognizing unit 118 from tag information, the secondary subject recognizing unit 416 moves the processing to step S1804.

The secondary subject recognizing unit 416 updates, in step S1804, an identification name "not applicable" of the additional information obtained from the subject recognizing unit 118 to an identification name obtained in step S1803, and moves the processing to step S1805.

According to the present embodiment, even in the case where additional information cannot be generated from a refocus image, obtaining information on subjects using tag information of light field information can attach tag information that is necessary for the refocus image.

Embodiment 6

Figure 19:
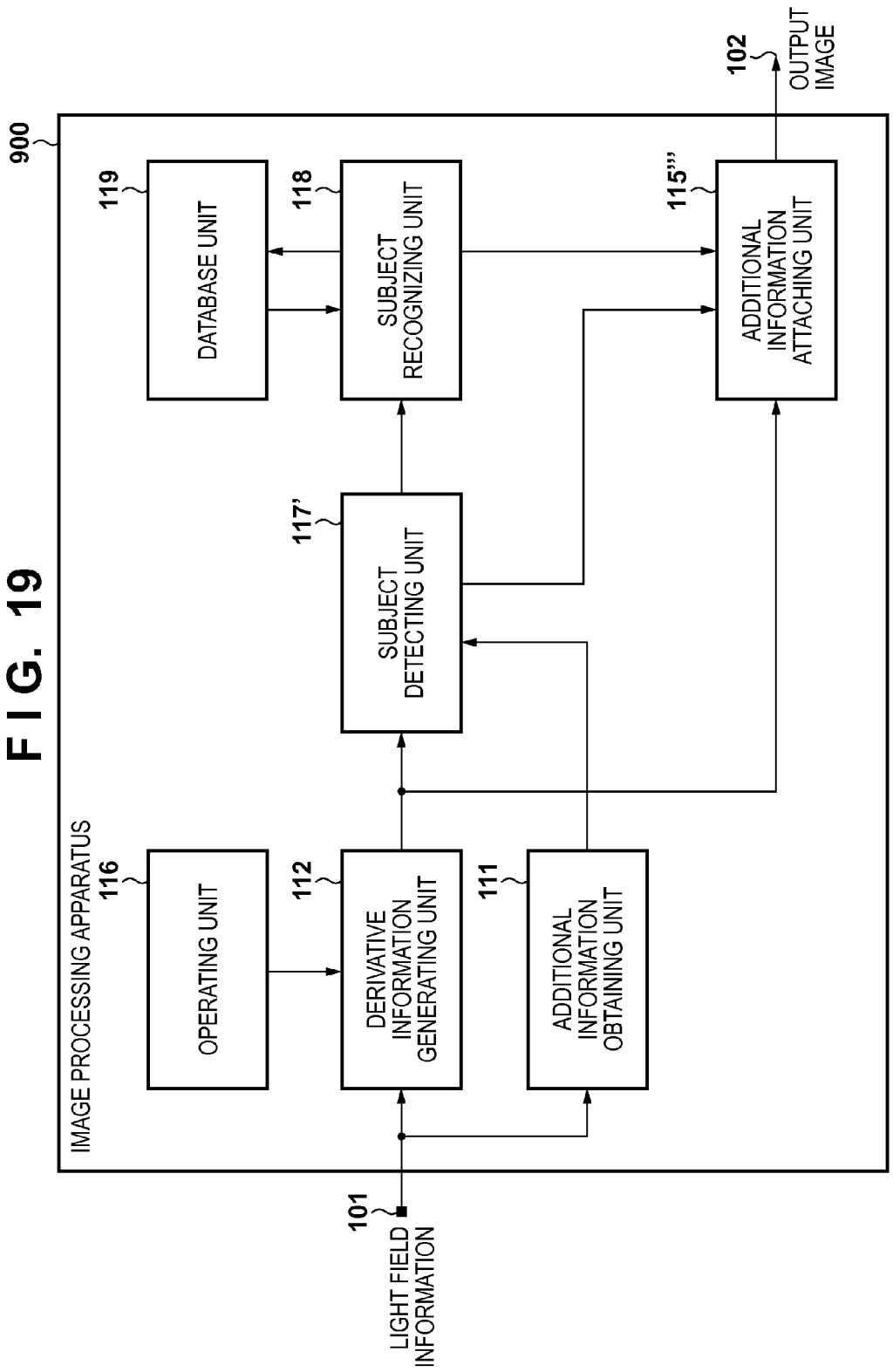
FIG. 19 is a block diagram showing an example of the functional configuration of an image processing apparatus according to Embodiment 6.

Hereinafter, Embodiment 6 of the present invention will be described. FIG. 19 is a block diagram showing an example of the functional configuration of an image processing apparatus 900 according to the present embodiment. In FIG. 19, the same reference numerals are given to functional configurations similar to the image processing apparatus 100 shown in FIG. 1, the image processing apparatus 120 shown in FIG. 12, and the image processing apparatus 400 shown in FIG. 16, and redundant description is omitted. Hereinafter, the configuration and the operations of the image processing apparatus 900 will be described focusing on differences from Embodiment 1 and 4, with reference also to a flowchart shown in FIG. 20. The same reference numerals are given to processing steps in FIG. 20 that are similar to Embodiment 1 or 4, and redundant description is omitted.

A subject detecting unit 117' receives tag information output from an additional information obtaining unit 111 and a refocus image generated by a derivative information generating unit 112, and executes subject detection processing (step S2001). The subject detecting unit 117' then outputs tag information on subjects (step S2002, YES) that are successfully recognized in the subject detection processing to an additional information attaching unit 115''', and outputs subject detecting information on subjects (step S2002, NO) that could not be recognized to a subject recognizing unit 118.

The subject recognizing unit 118 recognizes, similarly to Embodiment 4, subjects whose subject detection information is obtained from the subject detecting unit 117' using information registered in a database unit 119, and outputs identification information on subjects to the additional information attaching unit 115''' as additional information (step S1502).

The additional information attaching unit 115''' attaches both additional information output from the subject recognizing unit 118 and additional information output from the subject detecting unit 117' to the refocus image generated by the derivative information generating unit 112 (step S407), and generates an output image 102 (step S408).

In the present embodiment, it is assumed that tag information described using FIGS. 6A and 6B in Embodiment 2 is added to light field information 101, and the database unit 119 stores identification data shown in FIG. 14B, and a refocus image is the same as an image shown in FIG. 13A.

Figure 20:
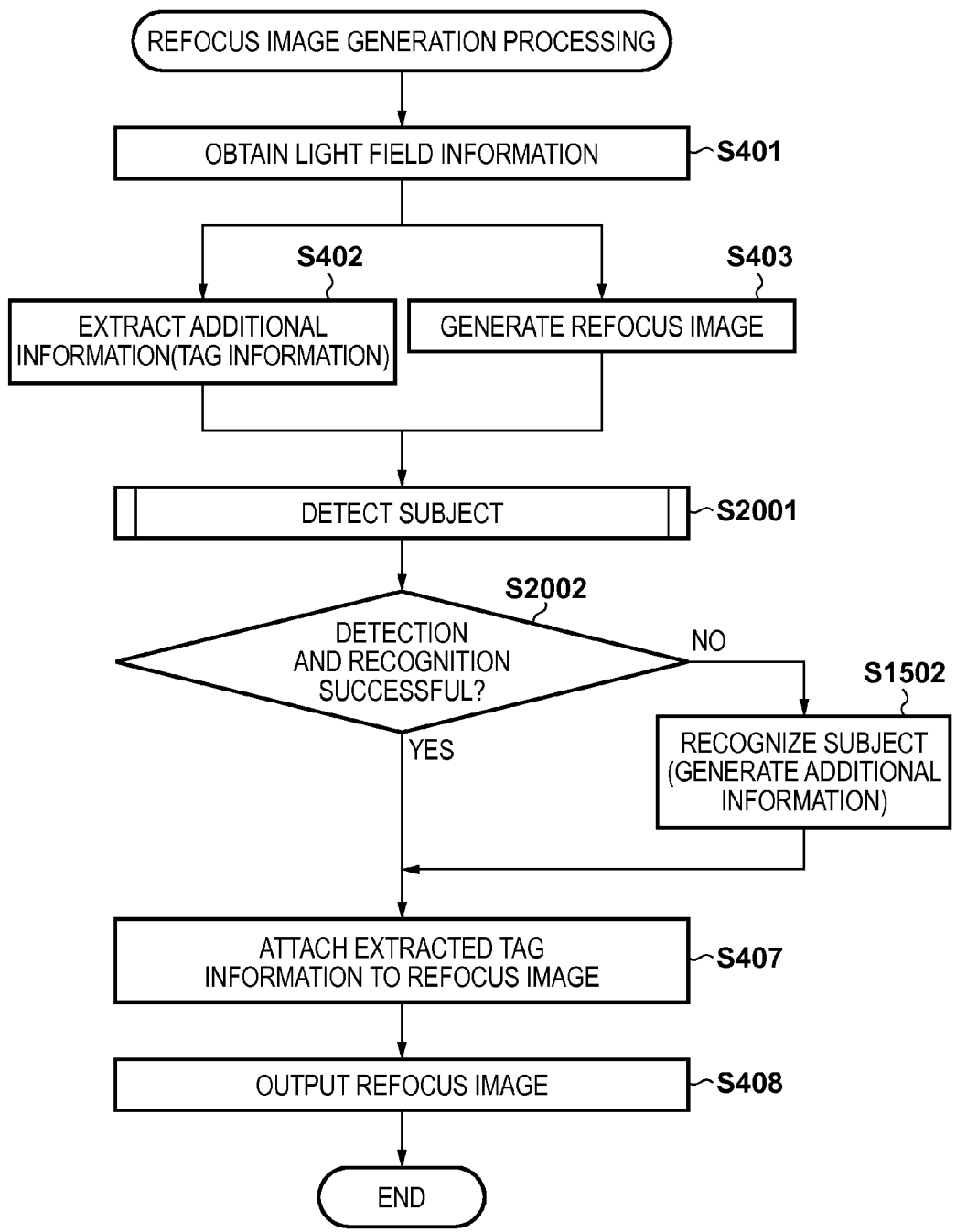
FIG. 20 is a flowchart for describing refocus image generation processing in Embodiment 6.

An example of subject detection processing performed by the subject detecting unit 117' in step S2001 of FIG. 20 will be described in detail using a flowchart shown in FIG. 21. The subject detecting unit 117' executes subject detection processing for a derivative information generated by the derivative information generating unit 112.

In step S1501, similarly to Embodiment 4, the subject detecting unit 117' performs subject detection on a refocus image, and determines position information (coordinate information specifying feature regions) on each detected subject.

The subject detecting unit 117' determines, in step S2102, whether or not processing subsequent to step S2103 has been executed for all subjects detected in step S1501, and the subject detecting unit 117' moves the processing to step S2103 if there are unprocessed subjects, and ends the processing if there are no unprocessed subjects.

In step S2103, the subject detecting unit 117' determines whether or not coordinate information corresponding to the coordinate information detected in step S1501 is included in tag information extracted by the additional information obtaining unit 111 from the light field information 101. Here, "corresponding" is not limited to a case of coinciding with, and may include a case in which overlapped amounts or ratios of feature regions specified by coordinate information are greater than or equal to a threshold.

In step S2103, the subject detecting unit 117' moves the processing to step S2104 in the case where tag information includes the corresponding coordinate information, and moves the processing to step S2102 in the case where tag information does not include the corresponding coordinate information.

In step S2104, the subject detecting unit 117' obtains identification names of subjects that are found in step S2103 and are included in tag information that corresponds to coordinate information, as additional information.

As described above, after executing subject detection processing, with regard to subjects whose tag information corresponding to coordinate information was found (successfully recognized), the subject detecting unit 117' outputs identification names obtained in step S2104 to the additional information attaching unit 115''' as additional information. Also, with regard to subjects whose tag information corresponding to coordinate information was not found (not successfully recognized), the subject detecting unit 117' outputs coordinate information on subjects to the subject recognizing unit 118.

According to the present embodiment, with regard to subjects that can be specified based on a refocus image and tag information of light field information without performing recognition processing in which feature amounts are used, additional information is generated using tag information of light field information. Therefore, it is possible to attach tag information that is necessary for a refocus image while reducing processing performed in a subject recognizing unit 118.

Other Embodiments

Although in the above described embodiments, the cases where a derivative information generating unit generates a refocus image are described, the present invention is applicable to the case where light field information in which a refocusable range is smaller than the original light field information is generated. Light field information in which a refocusable range is smaller than the original light field information can be generated by adding pixels having small differences in parallaxes, or by reducing light field information given from pixels that pass through portions of viewpoints or portions of pupil regions. In this case, because a refocusable region indicates a region of a focus distance, for example, in the cases of Embodiments 1 and 2, information on subjects included from the near end of a refocusable region to the depth of field at the near side and from the far end thereof to the depth of field at the far side may be added. Also in other embodiments, a refocus image may be generated with a focus distance corresponding to at least the near end and the far end of a refocusable region, and the processing results for respective refocus images may be combined.

Also, the functional blocks of image processing apparatuses according to the above described embodiments may respectively be realized by hardware such as ASIC, or may be realized by software that causes a programmable processor such as an MPU or a CPU to function similarly to the functional blocks. In this case, an MPU or a CPU that controls an apparatus may be used, or a separate MPU or CPU may be used. Alternatively, the functional blocks thereof may be realized by a combination of software and hardware. Also, even if functional blocks are illustrated by separate functional blocks, they are not limited to corresponding to separate hardware and/or software. Image processing apparatuses according to the above described embodiments can be implemented in arbitrary electric devices such as image capture apparatuses, communicating apparatuses and information processing apparatuses.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-029962, filed on Feb. 19, 2014, which is hereby incorporated by reference herein in its entirety.

What is claimed is:

1. An image processing apparatus for processing light field information indicating an intensity distribution of light and an incident direction of light, the image processing apparatus comprising:
   a processor; and
   a memory that stores a program executable by the processor;
   wherein the program, when executed by the processor, causes the processor to function as:
   an image generating unit configured to generate a refocus image from the light field information;
   a first obtaining unit configured to obtain a depth of field of the refocus image;
   an information generating unit configured to generate first additional information to be attached to the refocus image, based on the depth of field of the refocus image;
   an attaching unit configured to attach the first additional information to the refocus image;
   a second obtaining unit configured to obtain second additional information, which is provided together with the light field information and includes subject information; and
   a distance calculating unit configured to determine a subject distance with regard to each piece of subject information included in the second additional information, from the light field information and the second additional information,
   wherein the information generating unit generates the first additional information by extracting subject information, of which subject distance determined by the distance calculating unit is included in the depth of field, from among pieces of subject information included in the second additional information.

2. The image processing apparatus according to claim 1, wherein the distance calculating unit includes:
   a distance map generating unit configured to generate a distance map representing a distribution of subject distances in an imaging range of the light field information, from the light field information; and
   a calculating unit configured to determine the subject distance, from position information on a subject included in subject information included in the second additional information and the distance map.

3. The image processing apparatus according to claim 1, wherein the second additional information is provided as tag information of the light field information.

4. The image processing apparatus according to claim 1, wherein the refocus image is an image in which any one of subject distances is focused.

5. The image processing apparatus according to claim 1, wherein the refocus image is an image to which corresponding light field information has a smaller range in which a subject distance is focusable than the light field information.

6. The image processing apparatus according to claim 1, wherein the information representing the feature of the refocus image is a depth of field of the refocus image, and
   wherein the obtaining unit obtains the depth of field of the refocus image based on a focus distance used when the refocus image is generated, a focal distance and an aperture value of a lens when the light field information is generated.

7. A method for controlling an image processing apparatus for processing light field information indicating an intensity distribution of light and an incident direction of light, the method comprising:
   generating a refocus image from the light field information;
   obtaining a depth of field of the refocus image;
   generating first additional information to be attached to the refocus image, based on the depth of field of the refocus image;
   attaching the first additional information to the refocus image;

obtaining second additional information, which is provided together with the light field information and includes subject information; and determining a subject distance with regard to each piece of subject information included in the second additional information, from the light field information and the second additional information, wherein the first additional information is generated by extracting subject information, of which subject distance determined in the determining is included in the depth of field, from among pieces of subject information included in the second additional information.

8. A non-transitory computer-readable recording medium that stores a program for causing a computer to function as an image processing apparatus for processing light field information indicating an intensity distribution of light and an incident direction of light, comprising:

an image generating unit configured to generate a refocus image from the light field information;

a first obtaining unit configured to obtain a depth of field of the refocus image;

an information generating unit configured to generate first additional information to be attached to the refocus image, based on the depth of field of the refocus image;

an attaching unit configured to attach the first additional information to the refocus image;

a second obtaining unit configured to obtain second additional information, which is provided together with the light field information and includes subject information; and a distance calculating unit configured to determine a subject distance with regard to each piece of information included in the second additional information, from the field information and the second additional information, wherein the information generating unit generates the first additional information by extracting subject information, of which subject distance determined by the distance calculating unit is included in the depth of field, from among pieces of subject information included in the second additional information.

* * * * *